United States Patent
Sangawa et al.

(10) Patent No.: US 9,014,565 B2
(45) Date of Patent: Apr. 21, 2015

(54) OPTICAL MICROPHONE

(71) Applicant: Panasonic Corporation, Osaka (JP)

(72) Inventors: Ushio Sangawa, Nara (JP); Takuya Iwamoto, Osaka (JP); Yuriko Kaneko, Nara (JP); Masahiko Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 122 days.

(21) Appl. No.: 13/872,213

(22) Filed: Apr. 29, 2013

(65) Prior Publication Data

US 2013/0230329 A1     Sep. 5, 2013

Related U.S. Application Data

(63) Continuation of application No. PCT/JP2012/002315, filed on Apr. 3, 2012.

(30) Foreign Application Priority Data

Apr. 5, 2011   (JP) .................................. 2011-083682

(51) Int. Cl.
*H04B 10/112*   (2013.01)
*H04R 23/00*   (2006.01)
*H04B 10/114*   (2013.01)

(52) U.S. Cl.
CPC ............ *H04R 23/008* (2013.01); *H04B 10/114* (2013.01); *H04R 2410/00* (2013.01)

(58) Field of Classification Search
USPC .................................................. 398/132–134
See application file for complete search history.

(56) References Cited

U.S. PATENT DOCUMENTS 3,175,088 A * 3/1965 Herriott ......................... 398/132
3,286,032 A * 11/1966 Baum ............................ 381/172

(Continued)

FOREIGN PATENT DOCUMENTS

JP           3633926 B     1/2005
JP       2009-085868 A    4/2009

(Continued)

OTHER PUBLICATIONS

International Search Report for corresponding International Application No. PCT/JP2012/002315 mailed May 29, 2012.

*Primary Examiner* — Li Liu
(74) *Attorney, Agent, or Firm* — Renner, Otto, Boisselle & Sklar, LLP

(57) ABSTRACT

An optical microphone includes: a light source; a first polarizer for allowing linearly-polarized light, of light output from the light source, to pass therethrough; a second polarizer for allowing linearly-polarized light having a different polarization plane from the first polarizer to pass therethrough; a sound-receiving section including an acoustic medium having a smaller sound velocity than the air, wherein an acoustic signal propagates through the acoustic medium, the sound-receiving section being arranged so that the linearly-polarized light from the first polarizer passes through the acoustic medium and enters the second polarizer; and a photodetector for converting an intensity of light having passed through the second polarizer to an electric signal, wherein between the first polarizer and the second polarizer, the linearly-polarized light having passed through the first polarizer is given different phase shifts in two orthogonal directions which are each different from a polarization direction.

14 Claims, 13 Drawing Sheets

(56) References Cited

U.S. PATENT DOCUMENTS

| | | | |
|---|---|---|---|
| 3,379,887 A * | 4/1968 | Stephany | 398/170 |
| 3,466,446 A * | 9/1969 | Fassett | 398/134 |
| 4,105,919 A * | 8/1978 | Bridges et al. | 250/341.3 |
| 4,238,856 A * | 12/1980 | Bucaro et al. | 398/134 |
| 4,442,750 A * | 4/1984 | Bowley | 84/724 |
| 5,357,362 A * | 10/1994 | Azuma et al. | 398/134 |
| 2004/0113522 A1 | 6/2004 | Nagahara et al. | |
| 2006/0123884 A1* | 6/2006 | Selker et al. | 73/24.02 |
| 2007/0081165 A1* | 4/2007 | Kilic et al. | 356/477 |
| 2008/0034866 A1* | 2/2008 | Kilic et al. | 73/514.26 |
| 2011/0123199 A1 | 5/2011 | Hashimoto et al. | |

FOREIGN PATENT DOCUMENTS

| | | |
|---|---|---|
| JP | 2009-128103 A | 6/2009 |
| JP | 4454696 B | 2/2010 |
| JP | 2010-245599 A | 10/2010 |

* cited by examiner

OPTICAL MICROPHONE

This is a continuation of International Application No. PCT/JP2012/002315, with an international filing date of Apr. 3, 2012, which claims priority of Japanese Patent Application No. 2011-083682, filed on Apr. 5, 2011, the contents of which are hereby incorporated by reference.

BACKGROUND

1. Technical Field

The present application relates to an optical microphone for detecting an acoustic signal using light.

2. Description of the Related Art

Microphones for detecting an acoustic signal using a diaphragm and converting the acoustic signal to an electrical signal have been widely used in the art. Such a microphone includes a diaphragm, which is a mechanically vibrating portion. Therefore, the characteristics of the diaphragm may possibly deteriorate while using the microphone repeatedly. When an acoustic signal of a high intensity is detected using the microphone, the diaphragm of the microphone may possibly be vibrated significantly by the acoustic signal, thereby breaking the diaphragm.

Moreover, one cannot expect a microphone to detect a desirable acoustic signal at frequencies greater than or equal to the lowest resonance frequency of the diaphragm. Therefore, it is difficult for a microphone to detect frequencies over a wide range (hereinafter referred to as the "wide-range property".). When the diaphragm is downsized in order to obtain a wide-range property, the acoustic signal detection sensitivity decreases.

In contrast, Japanese Laid-Open Patent Publication No. 2009-85868 (hereinafter, referred to as "Patent Document No. 1"), for example, proposes an optical microphone for detecting an acoustic signal using light and converting the acoustic signal to an electric signal. A conventional optical microphone disclosed in Patent Document No. 1 will now be described.

FIG. 20 shows a conventional optical microphone 141 disclosed in Patent Document No. 1. The optical microphone 141 includes a receiving mechanism section 1410 and a laser Doppler vibrometer 148.

The receiving mechanism section 1410 includes a base portion 143 having a depressed portion, and a transparent support plate 145 transparent to a laser beam 147. The depressed portion of the base portion 143 and the transparent support plate 145 together form a space. This space is filled with a nanoporous material 142 which is a propagation medium.

A medium whose sound velocity is slow (small acoustic impedance) and which has a small acoustic propagation loss, such as a dry silica gel disclosed in Japanese Patent No. 3633926 (hereinafter, referred to as "Patent Document No. 2"), for example, is used as the nanoporous material 142. The base portion 143 includes an opening 144 for introducing an acoustic signal 149 to the nanoporous material 142. The bottom surface of the depressed portion of the base portion 143 is a reflective surface 1411.

The laser Doppler vibrometer 148 outputs the laser beam 147 from outside the receiving mechanism section 1410. The laser beam 147 passes through the transparent support plate 145 and the nanoporous material 142 to be reflected at the reflective surface 1411. The laser beam 147, which has been reflected at the reflective surface 1411, passes through the nanoporous material 142 and the transparent support plate 145 to return to the laser Doppler vibrometer 148.

The ambient acoustic signal 149 enters the receiving mechanism section 1410 through the opening 144 and is refracted at the interface between the air and the nanoporous material 142 to enter the nanoporous material 142 with a high efficiency. The incident acoustic signal 149 is converted to a compressional wave 1412 which travels through the nanoporous material 142. At the spot position, on the nanoporous material 142, of the laser beam 147 output from the laser Doppler vibrometer 148, the produced compressional wave 1412 is observed as a temporal fluctuation in density. Since the density change causes a refractive index change, a temporal fluctuation in refractive index occurs at the spot position in accordance with the acoustic signal 149.

As shown in FIG. 20, when the laser beam 147 is allowed to enter from the direction normal to the interface between the nanoporous material 142 and the transparent support plate 145, the amount of fluctuation in phase which the laser beam 147 having passed therethrough undergoes due to the temporal fluctuation in refractive index is optically equivalent to the amount of fluctuation in phase to be undergone on the assumption that the reflective surface 1411 were in oscillatory motion in the normal direction in accordance with the temporal fluctuation in refractive index at the spot position. Therefore, the laser beam 147 reflected and returning from the reflective surface 1411 undergoes a Doppler shift that associated with the oscillatory motion of the reflective surface 1411. The laser Doppler vibrometer 148 measures the light component which has undergone the Doppler shift included in the returning laser beam 147 having been reflected at the reflective surface 1411. The light intensity for each amount of frequency shift is detected by obtaining the Fourier coefficient with respect to the amount of frequency shift of the light component.

The fluctuation in refractive index is generally in proportion to the sound pressure of the acoustic signal 149, and the amount of Doppler shift (amount of frequency change) is in proportion to the velocity of the oscillatory motion. Therefore, the laser Doppler vibrometer 148 outputs a signal that is generally in proportion to the time derivative of the acoustic signal 149. By performing an integration operation or an appropriate filter operation on the output signal, it is possible to obtain an electric signal associated with the acoustic signal. Thus, the optical microphone 141 can be made to operate as a microphone having intended acoustic characteristics.

SUMMARY

An optical microphone disclosed in the present application includes: a light source; a first polarizer for allowing linearly-polarized light, of light output from the light source, to pass therethrough; a second polarizer for allowing linearly-polarized light having a different polarization plane from the first polarizer to pass therethrough; a sound-receiving section including an opening, and an acoustic medium having a smaller sound velocity than an air, wherein an acoustic signal entering through the opening propagates through the acoustic medium, the sound-receiving section being arranged so that the linearly-polarized light having passed through the first polarizer passes through the acoustic medium so as to cross a path along which the acoustic signal propagates and enters the second polarizer; and a photodetector for converting an intensity of light having passed through the second polarizer to an electric signal, wherein between the first polarizer and the second polarizer, the linearly-polarized light having passed through the first polarizer is given different phase shifts in two orthogonal directions which are each different from a polarization direction.

The optical microphone disclosed in the present application detects not interference of light but a rotation of a polarization plane of light due to optical birefringence caused in the acoustic medium by the application of the acoustic signal thereto. Therefore, it is possible to configure an optical microphone without using a narrow-range light source, acousto-optic modulators and an optical interferometer. Therefore, it is possible to realize an optical microphone that is small and highly resistant against ambient environment fluctuations.

As it further includes an elliptically-polarized light generation section, it is possible to further increase the detection sensitivity.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
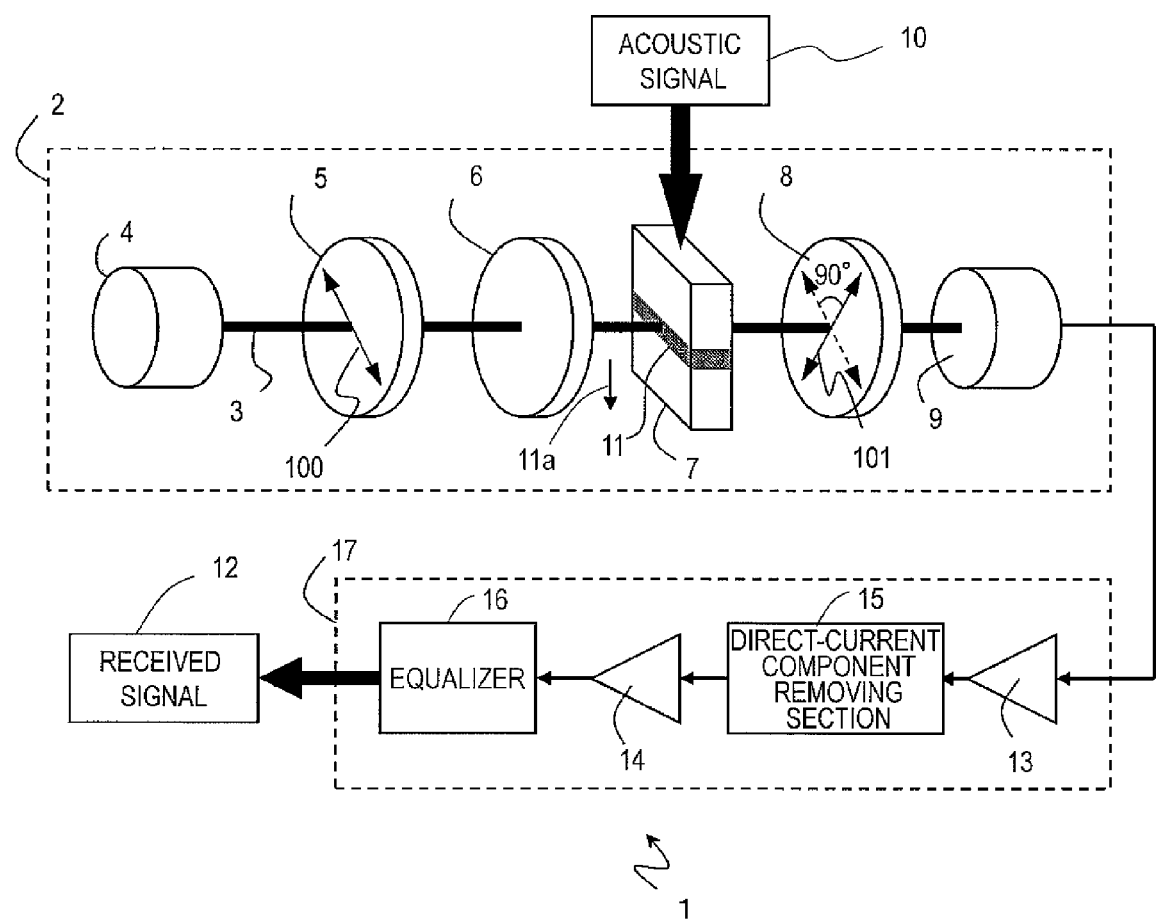
FIG. 1 is a diagram schematically showing a configuration of an optical microphone according to a first embodiment.

The conventional optical microphone described above has a high acoustic detection sensitivity. However, according the inventive review by the inventors of the present application, it is difficult to downsize an optical microphone and to realize a stability against environmental change (vibration and temperature changes).

Specifically, the laser Doppler vibrometer 148 detects, with an optical interferometer, the Doppler frequency of scattered light from a moving object to be measured with respect to the output laser beam frequency. Therefore, the laser Doppler vibrometer 148 includes therein a narrow-range light source, such as an He—Ne laser, and an optical interferometer. The laser Doppler vibrometer 148 also includes therein acousto-optic modulators for the purpose of frequency-modulating the frequency of the output laser beam in order to lift the Doppler frequency to a higher frequency range where it is easy to obtain a higher degree of frequency discrimination. Such a narrow-range light source and an acousto-optic modulator account for a physically large volume, leading to the first problem, i.e., the difficulty in downsizing the optical microphone.

The second problem, i.e., the stability of the device, is attributable to the laser Doppler vibrometer 148 having a high sensitivity not only to the motion status of the measured object but also to temporal changes in relative position between optical elements of the optical interferometer. In an optical interferometer, a laser beam is divided into two light beams, one of which is output to a measured object and the other is used as a reference beam. Then, the laser beam returning from the measured object and the reference beam are again superposed on each other to measure the measured object based on the temporal fluctuation in intensity change of the obtained interference light, and the cycle and phase of the fluctuation. The intensity change of interference light is determined based on an optical path length difference between two light beams. Therefore, the laser Doppler vibrometer 148 has an equal sensitivity to the temporal fluctuation in optical path length difference between the light beams after the laser beam is divided into two light beams. That is, when a vibration is applied to the laser Doppler vibrometer 148 from the ambient environment to vibrate the optical system of the optical interferometer, thereby causing temporal changes in optical path length difference, the optical path length fluctuations are also measured. Therefore, if the frequency of such a vibration lies within the frequency range of the acoustic signal, it becomes a noise component. As described above, an optical interferometer has a high sensitivity, but it has a problem that it is easily influenced by the environmental change.

In view of the above explained problems associated with the prior art, the present inventors have conducted a research on an optical microphone that is smaller than a conventional optical microphone and has a high stability against the environmental change (vibrations and temperature changes). As a result, it was found that it is possible to detect an acoustic signal by allowing linearly-polarized light (including elliptically-polarized light close to linearly-polarized light) to pass through a medium with the acoustic signal propagating therethrough, and detecting the polarization state of the passing light which changes in accordance with the propagating acoustic signal. In the present specification, the acoustic signal includes sound waves in the audible range and ultrasonic waves.

When an acoustic signal propagates through an acoustic medium, since an acoustic signal is a longitudinal wave, a density distribution of the acoustic medium, i.e., a refractive index distribution, that fluctuates over time is produced in the acoustic medium. Since the density distribution of the acoustic medium occurs in the propagation direction of the acoustic signal, and does not occur in the direction vertical to the propagation direction, the change in refractive index of the acoustic medium due to the density distribution is anisotropic. Therefore, an acoustic medium with an acoustic signal propagating therethrough shows birefringence (optical anisotropy).

A substance having birefringence has a fast axis, which is the direction in which the refractive index is small, and a slow axis, which is the direction in which the refractive index is large. When linearly-polarized light enters such a substance, the phase of the linearly-polarized light relatively advances in the fast-axis direction and the phase of the linearly-polarized light relatively retards in the slow-axis direction. As a result, linearly-polarized light is converted to elliptically-polarized light.

Therefore, if linearly-polarized light is allowed to pass through an acoustic medium with an acoustic signal propagating therethrough, the linearly-polarized light is converted to elliptically-polarized light, and the degree of polarization changes in accordance with the temporal change of the acoustic signal. Thus, it is possible to detect an acoustic signal by measuring fluctuations of the polarization plane of the elliptically-polarized light having passed through, as the light intensity of orthogonally-polarized light. According to this method, it is possible to detect an acoustic signal with a small and simple optical system configuration without using an optical interferometer that is unstable against fluctuations in the environmental change such as the temperature and vibrations, a narrow-range light source such as a laser which is a large optical element, an acousto-optic modulator for optical heterodyne detection, and the like.

An optical microphone disclosed in the present application includes: a light source; a first polarizer for allowing linearly-polarized light, of light output from the light source, to pass therethrough; a second polarizer for allowing linearly-polarized light having a different polarization plane from the first polarizer to pass therethrough; a sound-receiving section including an opening, and an acoustic medium having a smaller sound velocity than an air, wherein an acoustic signal entering through the opening propagates through the acoustic medium, the sound-receiving section being arranged so that the linearly-polarized light having passed through the first polarizer passes through the acoustic medium so as to cross a path along which the acoustic signal propagates and enters the second polarizer; and a photodetector for converting an intensity of light having passed through the second polarizer to an electric signal, wherein between the first polarizer and the second polarizer, the linearly-polarized light having passed through the first polarizer is given different phase shifts in two orthogonal directions which are each different from a polarization direction.

In one embodiment, between the first polarizer and the second polarizer, the linearly-polarized light having passed through the first polarizer is given different phase shifts in two orthogonal directions which are each different from a polarization direction.

In one embodiment, the optical microphone further includes: an elliptically-polarized light generation section arranged between the first polarizer and the second polarizer for converting the linearly-polarized light to elliptically-polarized light, wherein the linearly-polarized light is given different phase shifts in the two orthogonal directions by the elliptically-polarized light generation section.

In one embodiment, the elliptically-polarized light generation section includes at least one of a wave plate, a liquid crystal and an optical crystal having an optical anisotropy.

In one embodiment, the elliptically-polarized light generation section is located between the first polarizer and the sound-receiving section.

In one embodiment, the elliptically-polarized light generation section is located between the second polarizer and the sound-receiving section.

In one embodiment, the acoustic medium has an optical anisotropy, and the linearly-polarized light is given different phase shifts in the two orthogonal directions by the optical anisotropy.

In one embodiment, the optical anisotropy is generated by a residual stress of the acoustic medium.

In one embodiment, the sound-receiving section further includes a pressure-giving section for giving a static pressure to the acoustic medium, and the optical anisotropy is generated by the static pressure.

In one embodiment, an optical axis of the first polarizer and an optical axis of the second polarizer are orthogonal to each other.

In one embodiment, an optical axis of the elliptically-polarized light generation section and an optical axis of the second polarizer are orthogonal to each other.

In one embodiment, the optical microphone further includes a signal processing section for amplifying an electric signal converted by the photodetector.

In one embodiment, the signal processing section includes a direct-current component removing section for removing a direct-current component from the electric signal output from the photodetector.

In one embodiment, the signal processing section further includes a differential amplifier; and the differential amplifier amplifies and outputs a difference between the electric signal output from the photodetector and an output of the direct-current component removing section.

In one embodiment, the acoustic medium is a dry silica gel.

A method for detecting an acoustic signal disclosed in the present application includes the steps of: generating linearly-polarized light having a polarization plane in a predetermined direction; allowing the light to pass through an acoustic medium in which an acoustic signal to be detected propagates so as to cross a propagation path of the acoustic signal; allowing the light, having passed through the acoustic medium, to pass through polarizer having an optical axis in a direction different from the direction of the polarization plane; giving the light different phase shifts in two orthogonal directions which are each different from the direction of the polarization plane; and detecting the light, having passed through the polarizer, with a photodetector.

Embodiments of the optical microphone according to the present invention will now be described in detail.

First Embodiment

FIG. 1 shows a configuration of a first embodiment of an optical microphone of the present invention. An optical microphone 1 includes a detection optical system 2 and a signal processing system 17. The detection optical system 2 detects an acoustic signal propagating through the environment around the optical microphone 1 to produce an electric signal, and the signal processing system 17 performs a signal process on the electric signal, thereby producing a received signal 12. The components will now be described.

<Detection Optical System 2>

The detection optical system 2 includes a light source 4, a first polarizer 5, an elliptically-polarized light generation section 6, a sound-receiving section 7, a second polarizer 8, and a photodetector 9.

The light source 4 outputs a light beam 3. The light beam 3 used in the present embodiment may be coherent light or may be incoherent light. The occupied wavelength range of the light beam 3 may be a single or narrow range or may be a wide range. This is because the optical microphone 1 detects a change in the polarization state, but not the interference of light, as described above. Since linearly-polarized light is obtained by allowing the light beam 3 to pass through the first polarizer 5, the light beam 3 output from the light source 4 may be non-polarized light but not linearly-polarized light. Note however that as will be described below, if the function exerted by each of the other components of the detection optical system 2, such as the first polarizer 5, the second polarizer 8, the elliptically-polarized light generation section 6 and the sound-receiving section 7, has a wavelength dependency, the wavelength of the light beam 3 output from the light source 4 may be selected so that an intended performance of the optical microphone 1 as a whole is obtained.

It is preferred that the intensity of the light beam 3 output from the light source 4 is constant, and that the temporal fluctuation in intensity is small. Particularly, it is not preferred that the intensity fluctuation frequency is within the frequency range of the acoustic signal to be detected, because it may then become noise when the light source 4 detects an acoustic signal.

The light source 4 may be, for example, a gas laser source such as an He—Ne laser, a solid laser source, a fiber laser source, a semiconductor laser and a light emitting diode generally collimated by a lens, an aperture stop, or the like, a white light source (e.g., a light bulb) wavelength-restricted by a filter or collimated by an optical system. Note that where a gas laser source such as an He—Ne laser is used, the output may be stabilized.

The first polarizer 5 and the second polarizer 8 each include an optical axis 100 and an optical axis 101. The first polarizer 5 and the second polarizer 8 each allow a light beam having a polarization plane parallel to the optical axis thereof (the optical axis 100, the optical axis 101). Therefore, light that has passed through the first polarizer 5 and the second polarizer 8 is linearly-polarized light having a polarization plane parallel to the optical axes of the first polarizer 5 and the second polarizer 8.

As shown in FIG. 1, in the present embodiment, the optical axis 101 of the second polarizer 8 and the optical axis 100 of the first polarizer 5 are orthogonal to each other. Therefore, polarization planes of light passing through these two polarizers are orthogonal to each other. Note that the orthogonal relationship between the optical axis 101 of the second polarizer 8 and the optical axis 100 of the first polarizer 5 is based on the following definition.

The extinction ratio of the first polarizer 5 and the second polarizer 8 is dependent on the wavelength and the angle of incidence of the incident light. The wavelength dependency varies depending on the substance of the polarizer and the element structure. Herein, the angle of incidence refers to the angle between the normal to the plane of incidence of the first polarizer 5 and the second polarizer 8 and the light beam 3. Normally, the angle of incidence is selected to be 0°. The "extinction ratio" is a parameter representing the characteristics of the polarizer, and is defined by the inverse of the transmittance of linearly-polarized light having a polarization plane orthogonal to the optical axis, where the transmittance of linearly-polarized light having a polarization plane parallel to the optical axis of the polarizer is defined to be 1. As a polarizer has a higher extinction ratio, the polarizer less allows orthogonally-polarized light to pass therethrough. As the extinction ratio is higher, the sensitivity increases and it is possible to increase the detection sensitivity of the optical microphone 1 in a case where the first polarizer 5 and the second polarizer 8 are arranged so that the optical axes are orthogonal to each other so as to detect the change in the polarization state of linearly-polarized light having passed through the first polarizer 5 by allowing the light to pass through the second polarizer 8.

In the present specification, "the optical axis 100 of the first polarizer 5 and the optical axis 101 of the second polarizer 8 being orthogonal to each other" refers to a case where the angle φ between the optical axis 100 and the optical axis 101 satisfies the relationship of Expression 1 below.

[Exp. 1]

$$90° - \frac{180}{\pi} \text{ArcSin}\left(\sqrt{\frac{i}{I}}\right) \leq \phi \leq 90° + \frac{180}{\pi} \text{ArcSin}\left(\sqrt{\frac{i}{I}}\right) \quad (1)$$

In Expression 1, I is the light intensity of the light beam 3. i is the light intensity of light that has passed through the first polarizer 5, the elliptically-polarized light generation section 6 to be described below, and the second polarizer 8, where an acoustic signal 10 is not applied. ArcSin is an inverse sine function. An example of an inverse sine function is ArcSin $((\frac{1}{2})^{1/2}) = \pi/4$.

As will be described in detail below, the elliptically-polarized light generation section 6 generates a component parallel the optical axis 101 of the second polarizer 8 by changing the linearly-polarized light having passed through the first polarizer 5 into elliptically-polarized light, in order to increase the sensitivity of the optical microphone.

Expression 1 shows a condition such that the light component that passes through the second polarizer 8 with no acoustic signal incident is 50% or less of the light component that passes through the second polarizer 8 produced by the elliptically-polarized light generation section 6 if the angle between the optical axis 100 of the first polarizer and the optical axis 101 of the second polarizer 8 is shifted from 90° with the elliptically-polarized light generation section 6 not inserted. Note that as will be described below, the configuration of the elliptically-polarized light generation section 6 is determined from the sensitivity setting of the optical microphone 1.

Thus, since there is a close relationship between the detection sensitivity of the optical microphone 1 and the extinction ratio of the first polarizer 5 and the second polarizer 8, it is preferred to determine the wavelength of the light beam 3 output from the light source 4 and to determine the angle of incidence of the light beam 3 on the first polarizer 5 and the second polarizer 8 so that an intended extinction ratio is obtained.

The sound-receiving section 7 is arranged between the first polarizer 5 and the second polarizer 8 so that linearly-polarized light having passed through the first polarizer 5 passes therethrough to be incident on the second polarizer 8. In the sound-receiving section 7, when an acoustic signal propagates through the sound-receiving section 7, a density distribution 11 is produced in the acoustic medium. The linearly-polarized light having passed through the first polarizer 5 is allowed to pass so as to cross (to be non-parallel to) the propagation path of the density distribution 11. That is, in the sound-receiving section 7, the linearly-polarized light having passed through the first polarizer 5 crosses the path of the compressional wave due to the acoustic signal, and the optical axis of the linearly-polarized light is non-parallel to the propagation direction 11a of the compressional wave. It is preferred that the propagation direction 11a of the acoustic signal is unchanging at least in an area where the linearly-polarized light having passed through the first polarizer 5 passes.

Figure 2:
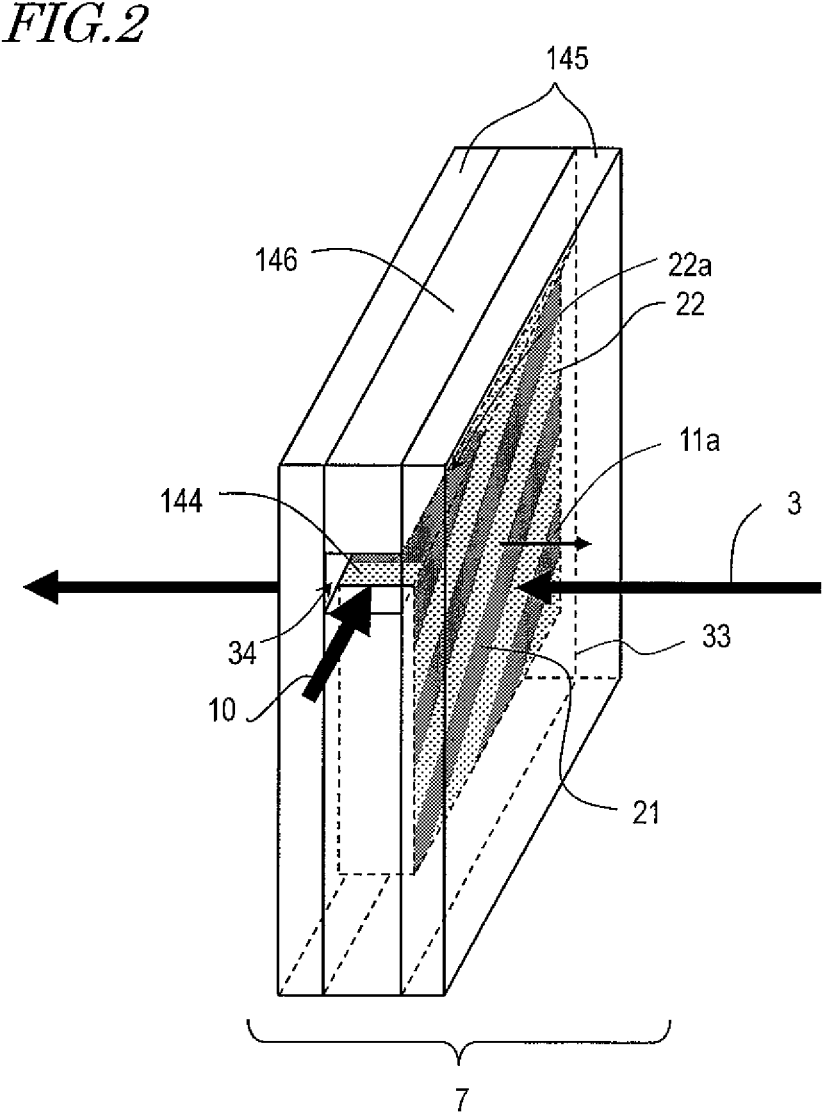
FIG. 2 is a diagram schematically showing a configuration of a sound-receiving section of the optical microphone of FIG. 1.

FIG. 2 is a perspective view showing an example of a configuration of the sound-receiving section 7. The sound-receiving section 7 includes an opening 144 where an acoustic signal goes into, and an acoustic medium 22 through which the acoustic signal propagates. The sound-receiving section 7 further include, for example, a pair of transparent support plates 145 transparent to the light beam 3, and a frame-shaped support portion 146, and a space 33 formed by the pair of transparent support plates 145 and the support portion 146 sandwiched therebetween is filled with the acoustic medium 22. An acoustic waveguide 34 one surface of which is defined by an upper surface 22a of the acoustic medium 22 is provided in the space 33, and is connected to the opening 144.

In the sound-receiving section 7, if the opening 144 is not too small compared with the wavelength of the acoustic signal 10 (plane wave) (e.g., the vertical and horizontal length of the rectangular shape defining the opening is 0.1 time or more the wavelength of the acoustic signal 10 (plane wave)), the acoustic signal 10 propagating from the opening 144 through the acoustic waveguide 34 enters the acoustic medium 22 through the upper surface 22a as it propagates, and it propagates through the acoustic medium 22 as a plane compressional wave 21. Therefore, by using the light beam 3 having a cross-sectional beam diameter sufficiently smaller than the wavelength of the plane wave 21 (e.g., 0.5 time or less the wavelength), the stress vector producing by the compressional wave is uniform in the area of the acoustic medium 22 that is illuminated by the light beam 3. Thus, as will be described in detail below, the slow axis and the fast axis in the acoustic medium 22 are also uniform, a correct detection of the acoustic signal 10 is achieved.

Note that in the sound-receiving section 7 shown in FIG. 2, as the wavelength of the acoustic signal 10 decreases, the flatness of the traveling compressional wave traveling through the acoustic medium 22 increases, thereby accurately defining the propagation direction 11a of the compressional wave (stress vector direction). Therefore, it suitably functions in applications for receiving an ultrasonic wave (acoustic signal whose frequency is 20 kHz or more).

The acoustic medium 22 may have a sound velocity smaller than the air. Specifically, the sound velocity of the acoustic medium 22 may be smaller than 340 m/sec, which is the sound velocity of the air. Since a material having a small sound velocity typically has a relatively small density, the reflection decreases (small acoustic impedance) at the interface between the environmental fluid such as the air and the acoustic medium 22, and an acoustic signal refracts into the acoustic medium 22 with a high efficiency.

The acoustic medium 22 may be a nanoporous material. For example, the acoustic medium 22 is a dry gel of an inorganic acid compound or an organic polymer. For example, a dry silica gel disclosed in Patent Document No. 2 can be used suitably. A nanoporous material has a structure in which silica particles whose diameter is on the order of nm to 10 nm are randomly, three-dimensionally coupled together. The sound velocity through the dry silica gel is about 50 m/sec or more and 150 m/sec or less, and is smaller than the sound velocity through the air as described above. The density of the dry silica gel is about 50 kg/m$^3$ or more and 200 kg/m$^3$ or less.

In order for birefringence to be expressed by an acoustic signal propagating through the acoustic medium 22, the Poisson's ratio of the nanoporous material may be smaller than 0.5. Normally, the Poisson's ratio of a solid substance is smaller than 0.5. The Poisson's ratio of a nanoporous material is about 0.2.

Figure 3:
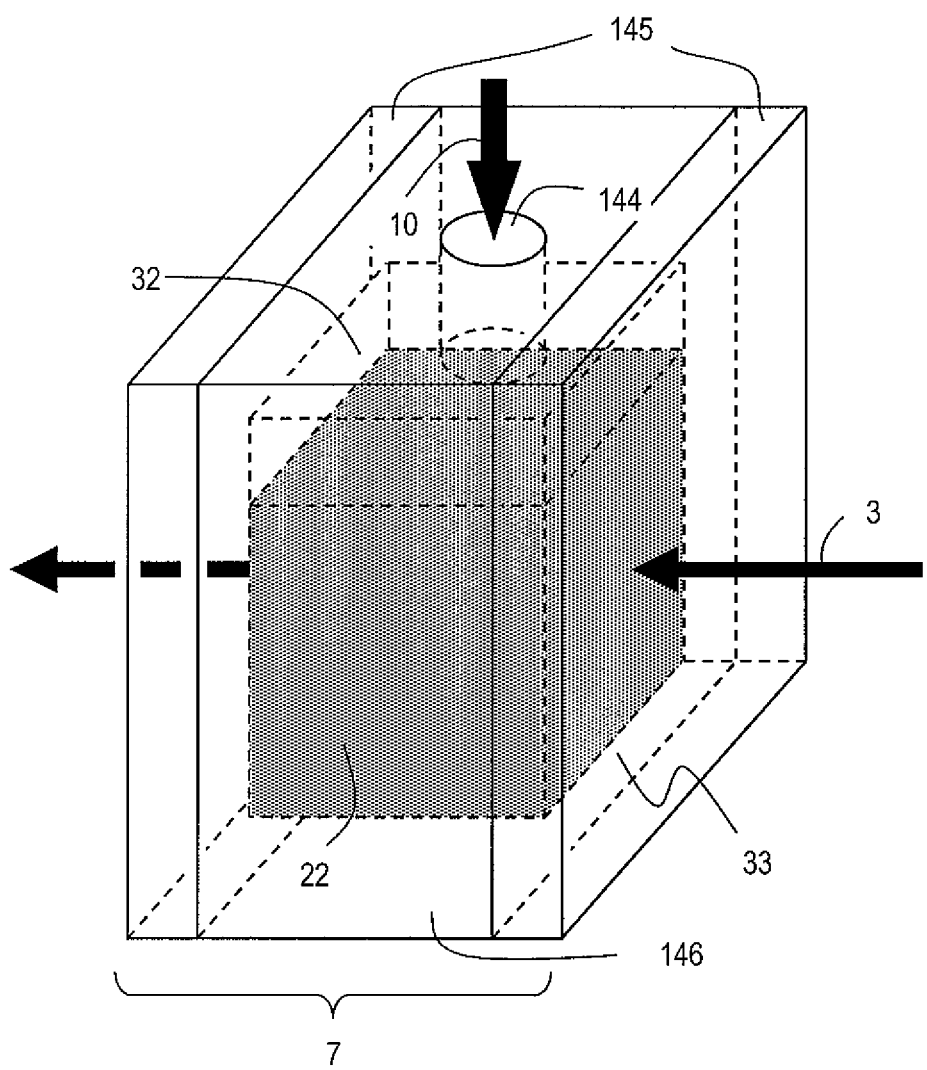
FIG. 3 is a diagram schematically showing another configuration of a sound-receiving section of the optical microphone of FIG. 1.

FIG. 3 is a perspective view showing another configuration example of the sound-receiving section 7. The sound-receiving section 7 includes the pair of transparent support plates 145, the frame-shaped support portion 146, and the acoustic medium 22. The space 33 is formed by the pair of transparent support plates 145 and the support portion 146 sandwiched therebetween. The opening 144, which connects between the space 33 and the outside, is provided in the support portion 146, and the acoustic signal 10 enters through the opening 144.

The space 33 is filled with the acoustic medium 22 except for an unfilled area 32. The unfilled area 32 is filled with the same environmental medium as the outside (e.g., the air). The acoustic signal 10 enters the unfilled area 32 from outside through the opening 144, and propagates into the acoustic medium 22. The light beam 3 enters through one of the transparent support plates 145, passes through the acoustic medium 22, and is output through the other transparent support plate 145.

The size of the unfilled area 32, i.e., the vertical length, horizontal length and height, may be sufficiently smaller than the wavelength of the acoustic signal 10. For example, the vertical length, horizontal length and height may be less than 0.5 times the wavelength of the acoustic signal 10 in the acoustic medium 22. Thus, the sound pressure of the acoustic signal 10 acts vertically and uniformly upon the interface with the environmental medium of the acoustic medium 22 via the opening 144. Therefore, the acoustic medium 22 receives a uniform pressure from a certain direction, whereby a stress having a stress vector in a direction vertical to the interface is generated generally uniformly across the entire area of the acoustic medium 22. The uniformity of the action of the sound pressure can be increased by holding the acoustic medium 22 in such a manner that the interface with the unfilled area 32 of the acoustic medium 22 is unfixed on interfaces of the transparent support plates 145 and the support portion 146. The sound-receiving section 7 shown in FIG. 3 is used suitably particularly when the acoustic signal is an audible sound (an acoustic signal whose frequency is less than 20 kHz).

The elliptically-polarized light generation section 6 gives linearly-polarized light having passed through the first polarizer 5 different phase shifts in two orthogonal directions which are each different from the polarization direction, between the first polarizer 5 and the second polarizer 8. Thus, linearly-polarized light is converted to elliptically-polarized light. The elliptically-polarized light generation section 6 is used for further increasing the detection sensitivity of the acoustic signal 10. The configuration of the elliptically-polarized light generation section 6 and the function thereof will be described in detail after describing the detection system 2.

The photodetector 9 converts the intensity of the light beam 3 having passed through the second polarizer 8 to an electric signal. The response characteristic of the photodetector 9 may be faster than the frequency of the acoustic signal 10 in order for the detection optical system to output an electric signal in accordance with the acoustic signal 10. Thus, an accurate conversion of the time waveform of the acoustic signal 10 to an electric signal is realized.

For the photodetector 9, realizing linearity of the output electric signal intensity with respect to the intensity of the incident light is preferable because it then reduces distortion in the sound-receiving characteristic of the optical microphone 1 and reduces computation performed by signal processing circuits to follow.

<Principle for Detecting Acoustic Signal by Detection Optical System 2>

Figure 4:
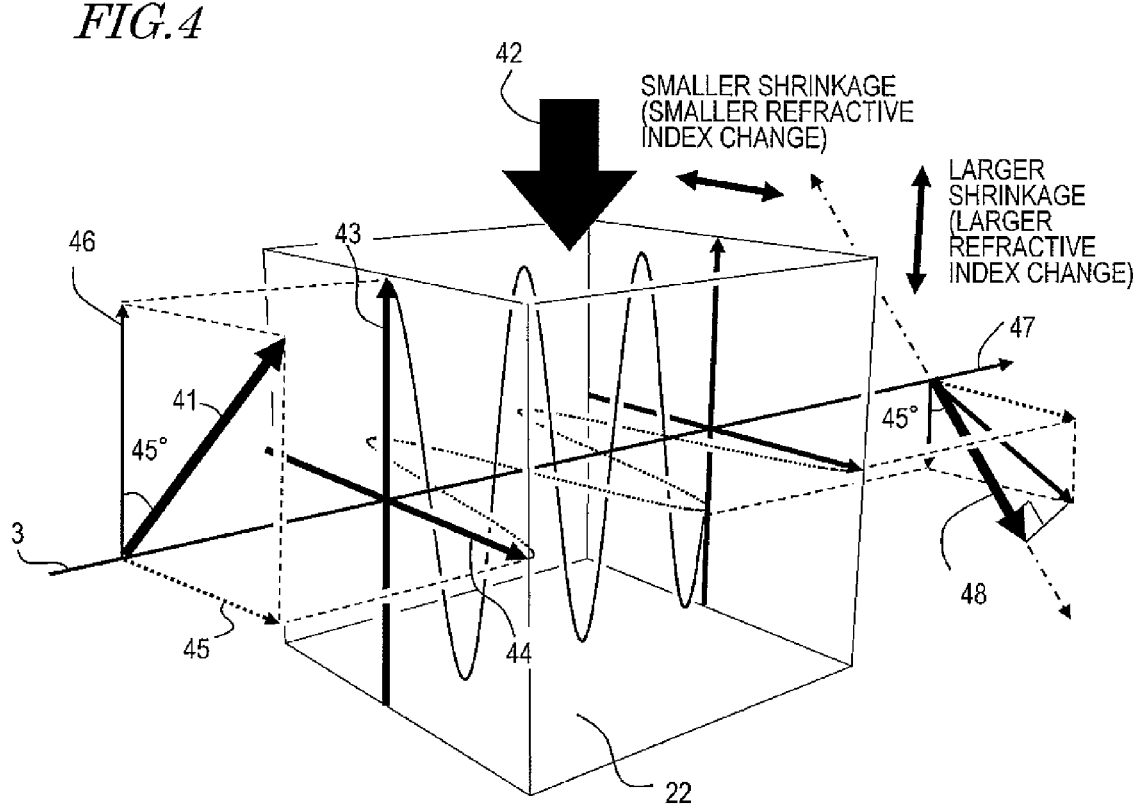
FIG. 4 is a schematic diagram showing the behavior of a light beam through an acoustic medium in a sound-receiving section of the optical microphone of FIG. 1.

Next, the principle for the detection optical system 2 to detect the acoustic signal 10 will be described. FIG. 4 schematically shows how the light beam 3 passes through the acoustic medium 22 in the sound-receiving section 7. A pressure 42 represents a pressure by an acoustic signal propagating through the sound-receiving section 7. FIG. 4 shows a case where the elliptically-polarized light generation section 6 is absent in the detection optical system 2 shown in FIG. 1. For the sake of simplicity, it is assumed that the light beam 3 in FIG. 4 is monochromatic light.

The light beam 3, immediately before entering the acoustic medium 22, has passed through the first polarizer 5 (not shown in FIG. 4). Therefore, the light beam 3 is linearly-polarized light 41. Herein, the first polarizer 5 is arranged so that the optical axis 100 of the first polarizer 5 forms an angle of 45° with respect to the stress vector of the pressure 42. Therefore, the polarization plane of the linearly-polarized light 41 forms an angle of 45° with respect to the stress vector of the pressure 42.

As described above, where the acoustic signal 10 propagates through the acoustic medium 22, since an acoustic signal is a longitudinal wave, there is produced an acoustic medium density distribution that fluctuates over time in the acoustic medium, i.e., a refractive index distribution. The density distribution of the acoustic medium occurs in the propagation direction of the acoustic signal 10, and does not occur in a direction vertical to the propagation direction. Therefore, as shown in FIG. 4, the direction parallel to the stress vector of the pressure 42 is defined as a slow axis 43, and the direction vertical to the stress vector of the pressure 42 is defined as a fast axis 44.

The linearly-polarized light 41 is expressed as a vector sum between a slow-axis component 46 having an electric field vector parallel to the slow axis 43 and a fast-axis component 45 having an electric field vector parallel to the fast axis 44. Before entering the acoustic medium 22, the fast-axis component 45 and the slow-axis component 46 are sinusoidal waves having the same frequency and being in phase (with no phase difference therebetween).

If the acoustic signal 10 is not propagating through the acoustic medium 22, and if the pressure 42 is not applied, the acoustic medium 22 is an optically isotropic medium. Therefore, the refractive indices to which the fast-axis component 45 and the slow-axis component 46 of the linearly-polarized light 41 are susceptible are equal to each other. Even after passing through the acoustic medium 22, the fast-axis component 45 and the slow-axis component 46 are in phase, and transmitted light 47 obtained by combining together the fast-axis component 45 and the slow-axis component 46 is linearly-polarized light having the polarization plane in the same direction as the linearly-polarized light 41.

In the present embodiment, the optical axis 101 of the second polarizer 8 (not shown in FIG. 4) is orthogonal to the optical axis 100 of the first polarizer 5. For the sake of simplicity, in the description of FIG. 4, it is assumed that the angle between the optical axis 101 of the second polarizer 8 and the optical axis 100 of the first polarizer 5 is 90°. Then, the transmitted light 47 having the polarization plane in the same direction as the optical axis of the first polarizer 5 is blocked by the second polarizer 8, and the output of an electric signal from the photodetector 9 (not shown in FIG. 4) is ideally zero.

Next, a case where the acoustic signal 10 is propagating through the acoustic medium 22 and the pressure 42 is applied will be described. As shown in FIG. 4, as the acoustic signal 10 propagates through the acoustic medium 22, thereby applying the pressure 42 in the direction parallel to the slow axis 43, the acoustic medium 22 is compressed by the pressure 42. The acoustic medium 22 significantly shrinks mainly in the slow axis 43 direction.

For example, where the Poisson's ratio of the acoustic medium 22 is about 0.2, the amount of expansion/contraction in the slow axis 43 is greater than the amount of expansion/contraction in the fast axis 44 in the acoustic medium 22. Where a positive stress in the slow axis direction is applied to the acoustic medium 22, it stretches in the fast axis 44, thereby relaxing the compression pressure in the slow axis 43 direction, but the amount of expansion/contraction in the slow axis 43 direction is different from that in the fast axis 44 direction. Therefore, the density of the acoustic medium 22 in the slow axis 43 direction is greater than the density thereof in the fast axis 44 direction. Due to the density difference, the refractive index in the slow axis 43 direction of the acoustic medium 22 is greater than the refractive index in the fast axis 44 direction.

Therefore, in the acoustic medium 22 with the acoustic signal 10 propagating therethrough, the fast-axis component 45 in the fast axis 44 direction of the linearly-polarized light 41 and the slow-axis component 46 in the slow axis 43 direction are different from each other in terms of the refractive indices they are susceptible to. As a result, although the fast-axis component 45 and the slow-axis component 46 are in phase immediately before entering the acoustic medium 22, the phase of the slow-axis component 46 retards behind the fast-axis component 45 after passing through the acoustic medium 22, whereby the fast-axis component 45 and the slow-axis component 46 are no longer in phase.

As shown in FIG. 4, the polarization plane of the transmitted light 47 is obtained by the vector sum between the fast-axis component 45 and the slow-axis component 46 immediately after passing through the acoustic medium 22. Since the fast-axis component 45 and the slow-axis component 46 of the transmitted light 47 are no longer in phase, the transmitted light 47 is elliptically-polarized light. The polarization plane of the transmitted light 47 rotates in synchronism with the frequency of the light beam 3.

Since the transmitted light 47 is elliptically-polarized light, an orthogonally-polarized light component 48 of the transmitted light 47 that has the polarization plane in the direction parallel to the optical axis 101 (FIG. 1) of the second polarizer 8 passes through the second polarizer 8 to reach the photodetector 9. Then, an electric signal produced by the detected orthogonally-polarized light component 48 is output from the photodetector 9.

The difference between the refractive index in the fast axis 44 direction and the refractive index in the slow axis 43 direction in the acoustic medium 22 is dependent on the magnitude of the pressure 42, i.e., the amplitude of the acoustic signal 10. The refractive index difference changes in accordance with the temporal change in the acoustic signal 10. Therefore, the electric signal output from the photodetector 9 corresponds to the acoustic signal 10.

Thus, the linearly-polarized light beam 3 having the polarization plane in a predetermined direction is produced by allowing it to pass through the first polarizer 5, and the light beam 3 is allowed to pass through the acoustic medium 22 with the acoustic signal 10 propagating therethrough so as to cross the propagation path of the acoustic signal 10. Then, the light beam 3 having passed through the acoustic medium 22 is allowed to pass through the second polarizer 8 whose optical axis is arranged in a direction different from the first polarizer 5 and is detected by the photodetector 9, whereby it is possible to detect the acoustic signal 10 and output it as an electric signal from the photodetector 9.

With the pressure 42 caused by the acoustic signal propagating through the acoustic medium 22 described above, the amount of deformation of the acoustic medium 22 changes linearly with respect to the magnitude of the pressure 42 applied. Since the refractive index of the acoustic medium 22 changes linearly with respect to the application of the pressure 42, the amplitude of the orthogonally-polarized light component 48 having passed through the second polarizer (the magnitude of the vector of the orthogonally-polarized light component 48) also changes linearly with respect to the pressure 42.

Since the photodetector 9 outputs an electric signal having an amplitude in proportion to the intensity of light, an electric signal whose amplitude is in proportion to the magnitude of the pressure 42 squared is output from the photodetector 9. The pressure 42 produced in the acoustic medium 22 by the acoustic signal 10 is very weak as compared with the atmospheric pressure. For example, while 1 atm is 101325 Pa, a pressure fluctuation of 1 Pa corresponds to an acoustic signal of about 94 dB SPL (Sound Pressure Level).

Therefore, in order to increase the sensitivity to the acoustic signal 10, it is preferred to increase the amount of change $\Delta S$ of the electric signal S with respect to the amount of change $\Delta P$ of the pressure 42. However, as described above, where the pressure 42 is not applied, the transmitted light 47 having passed through the acoustic medium 22 has the same polarization plane as the linearly-polarized light 41, and therefore there is ideally zero light that passes through the second polarizer 8. That is, since the electric signal S is in proportion to $P^2$, $\Delta S/\Delta P=0$ holds when P=0. Since the change $\Delta P$ of the pressure 42 by the acoustic signal 10 is weak as described above, it can be seen that the electric signal output from the photodetector 9 is also small. Therefore, the detection optical system 2 of the optical microphone 1 of the present embodiment preferably further includes the elliptically-polarized light generation section 6 in order to realize an optical microphone having a high sensitivity by increasing $\Delta S/\Delta P$ in the vicinity of where the pressure is zero (P=0).

The elliptically-polarized light generation section 6 converts linearly-polarized light having passed through the first polarizer 5 to weak elliptically-polarized light. Herein, "weak elliptically-polarized light" refers to elliptically-polarized light that is represented by an ellipse having a large amplitude ratio between two polarization directions orthogonal to the traveling direction of the light beam 3. This amplitude ratio is dependent on the performance required of the optical microphone 1, such as the linearity of the signal-receiving sensitivity to the sound pressure of an acoustic signal.

Referring to FIGS. 1 and 4, the operation of an optical microphone where the detection optical system 2 includes the elliptically-polarized light generation section 6 will be described. As the light beam 3 having passed through the first polarizer 5 passes through the elliptically-polarized light generation section 6, the light beam 3 includes an orthogonally-polarized light component of a lower intensity than the linearly-polarized light 41. This orthogonally-polarized light component is parallel to the direction orthogonal to the optical axis 100 of the first polarizer 5, and is parallel to the optical axis 101 of the second polarizer 8. Therefore, even under circumstances where the pressure 42 from the acoustic signal 10 is not applied, the light beam 3 output from the acoustic medium 22 includes weak orthogonally-polarized light 48, and the photodetector 9 outputs an electric signal.

By converting the linearly-polarized light 41 to weak elliptically-polarized light, a high detection sensitivity is obtained even when a weak pressure is applied. With the insertion of the elliptically-polarized light generation section 6, the electric signal S is in proportion to $(P+c1)^2+c2$ (c1 and c2 are each a positive constant that is not dependent on the pressure P) in the vicinity of where the pressure P is zero (P=0). Therefore, $\Delta S/\Delta P \neq 0$ holds at P=0, and it is possible to obtain a large amount of change $\Delta S$ of an electric signal output even in the vicinity of where the pressure is zero (P=0). That is, with the elliptically-polarized light generation section 6, the optical microphone 1 has a high sensitivity to the acoustic signal 10.

A specific configuration of the elliptically-polarized light generation section 6 will now be described. The detection optical system 2 shown in FIG. 5 includes a wave plate 51 as the elliptically-polarized light generation section 6. The wave plate 51 is arranged between the first polarizer 5 and the sound-receiving section 7. The wave plate 51 has an optical axis 102 that is non-parallel and non-vertical to the optical axis 100 of the first polarizer 5. Herein, "non-parallel" means that the angle between the optical axes is neither 0° nor 180°, and "non-vertical" means that the angle between the optical axes is neither 90° nor 270°.

As the wave plate 51, an ⅛ wave plate, a ¼ wave plate, a ½ wave plate, or the like, may be used. Alternatively, an optical crystal, a liquid crystal, or the like, having an optical anisotropy (birefringence) may be used. These may be used alone or two or more selected from among these may be used as the elliptically-polarized light generation section 6. Note however that it is preferred that the phase difference between the fast-axis component 45 and the slow-axis component 46 of the transmitted light 47 is not an integer multiple of the transmitted light wavelength.

Figure 5:
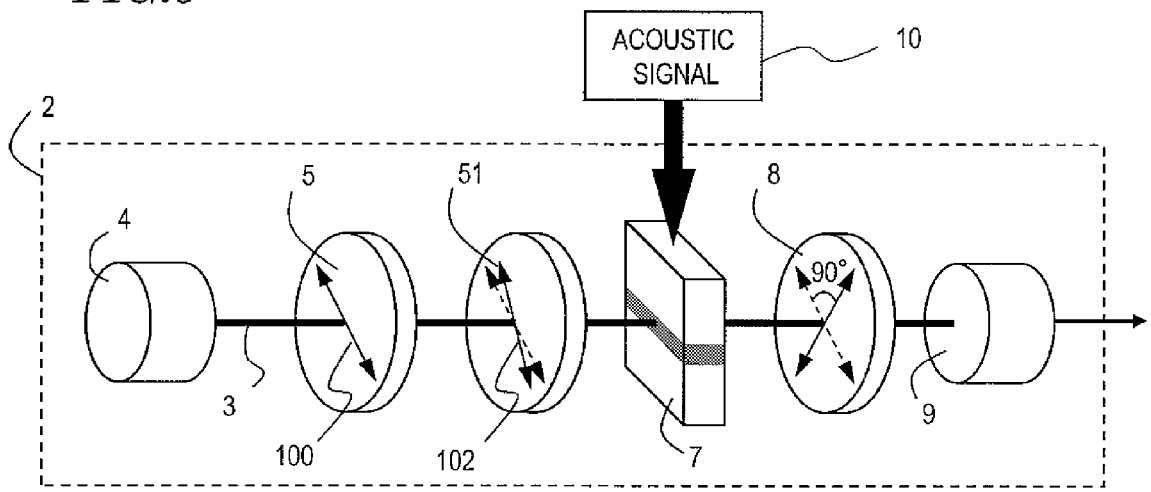
FIG. 5 is a diagram schematically showing a configuration of an elliptically-polarized light generation section of the optical microphone of FIG. 1.
Figure 6:
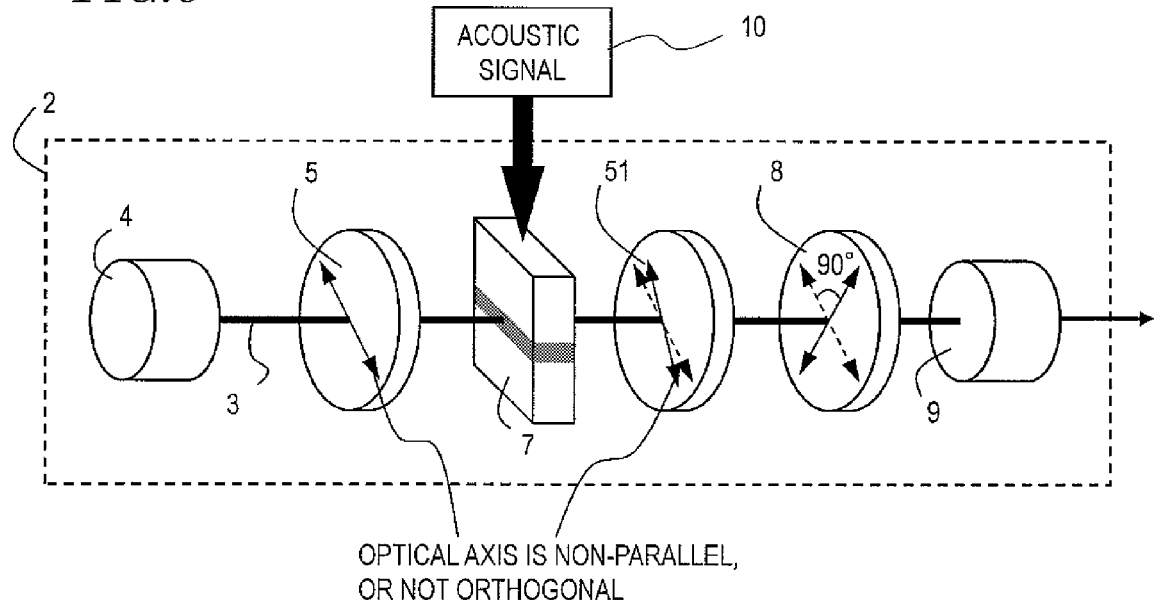
FIG. 6 is a diagram schematically showing another configuration of an elliptically-polarized light generation section of the optical microphone of FIG. 1.

FIG. 6 shows another configuration example of the detection optical system 2. In the detection optical system 2 shown in FIG. 6, the wave plate 51 is arranged between the sound-receiving section 7 and the second polarizer 8. The wave plate 51 has the same function as the wave plate 51 shown in FIG. 5 described above. Even if the detection optical system 2 shown in FIG. 6 is used, it is possible to obtain a large amount of change $\Delta S$ of an electric signal output even in the vicinity of where the pressure is zero (P=0). Thus, with the elliptically-polarized light generation section 6, the optical microphone 1 has a high sensitivity to the acoustic signal 10.

As described above, the elliptically-polarized light generation section 6 has the function of giving linearly-polarized light having passed through the first polarizer 5 different phase differences in two orthogonal directions which are each different from the polarization direction, between the first polarizer 5 and the second polarizer 8, thereby converting linearly-polarized light to elliptically-polarized light. Such a function is realized by allowing linearly-polarized light having passed through the first polarizer 5 to pass through a substance having birefringence. Since the acoustic medium 22 of the sound-receiving section 7 shows birefringence by adding pressure, the function of the elliptically-polarized light generation section 6 may be realized in the sound-receiving section 7.

Figure 7:
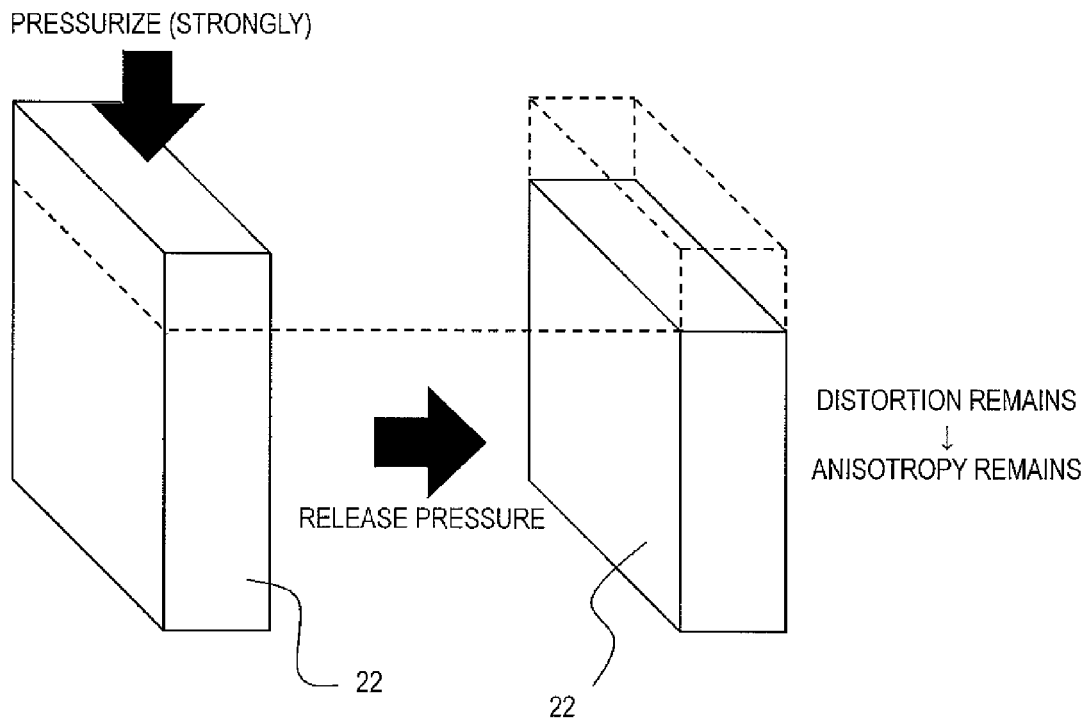
FIG. 7 is a diagram schematically showing a configuration of an acoustic medium of the optical microphone of FIG. 1.

Specifically, a strong pressure is applied from one direction so that the acoustic medium 22 of the sound-receiving section 7 deforms plastically as shown in FIG. 7 (pressurization). For example, where a dry silica gel having a density of 250 kg/m$^3$ is used as the acoustic medium 22, if a pressure of $4.1 \times 10^2$ gf/cm$^2$ or more is applied to the acoustic medium 22 from one direction, the acoustic medium 22 deforms plastically. Therefore, even after the pressure is released, there is a residual stress in the acoustic medium 22, the refractive index in the direction of the vector of the residual stress is greater than that in the direction vertical thereto, even in a state where the acoustic signal 10 is not propagating. The acoustic medium 22 has optical anisotropy in a state where the acoustic signal 10 is not propagating, and expresses the function described above of the elliptically-polarized light generation section 6. More specifically, in the vicinity of where the pressure 42 from the acoustic signal is zero (pressure P=0), the electric signal S output from the photodetector 9 is in proportion to $(P+P0)^2+c2$ (P0 and c2 are positive constants that are not dependent on the pressure P based on the residual stress in the acoustic medium 22).

Figure 8:
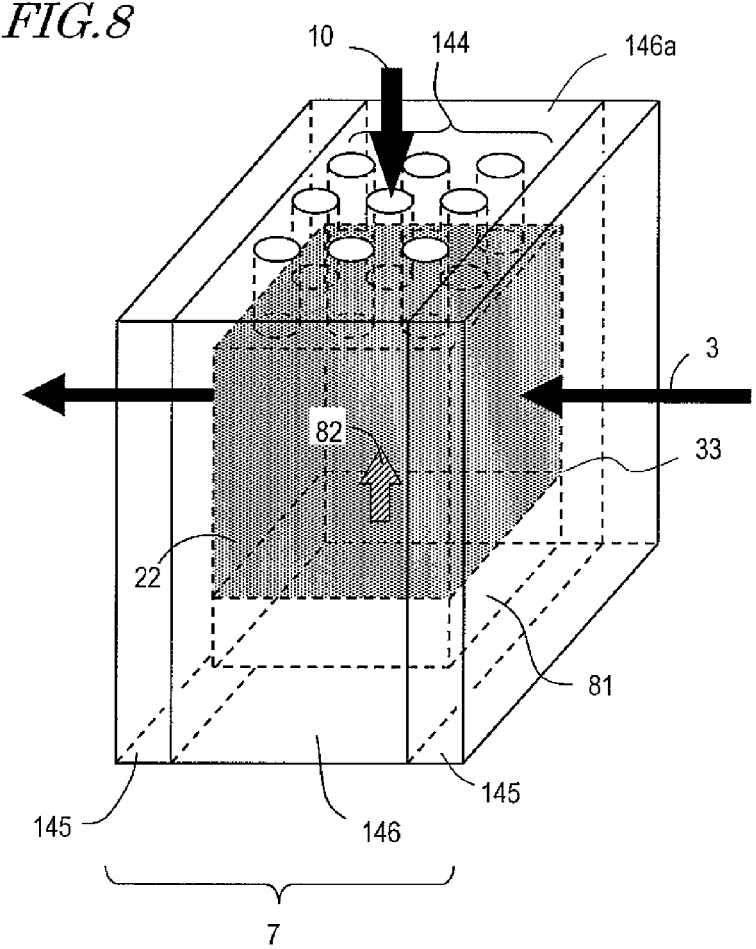
FIG. 8 is a diagram schematically showing another configuration of an acoustic medium of the optical microphone of FIG. 1.

The function of the elliptically-polarized light generation section 6 may be realized by applying a pressure to the acoustic medium 22 so that the acoustic medium 22 always shows optical anisotropy. The sound-receiving section 7 shown in FIG. 8 includes the pair of transparent support plates 145, the frame-shaped support portion 146, and the acoustic medium 22. The space 33 is formed by the pair of transparent support plates 145 and the support portion 146 sandwiched therebetween. A plurality of openings 144 are provided across the entirety of a surface 146a so that the acoustic signal 10 enters the acoustic medium 22 efficiently and uniformly from the entire surface 146a. For example, the surface 146a has a mesh structure. The acoustic medium 22 is provided in contact with the surface 146a.

On the other hand, a pressure-giving section 81, which is not filled with the acoustic medium 22 and is filled with a gas at a pressure greater than or equal to the atmospheric pressure, is provided on the opposite side of the space 33 from the surface 146a. Therefore, the acoustic medium 22 is pressed against the surface 146a with a predetermined static pressure. In the pressure-giving section 81, a spring, or the like, may be provided, instead of a gas with which the pressure-giving section 81 is filled at a pressure greater than or equal to the atmospheric pressure, thereby pressing the acoustic medium 22 against the surface 146a of the support portion 146. Also when using the sound-receiving section 7 of such a structure, the refractive index in the direction parallel to the static pressure is greater than that in the direction vertical thereto in a state where no acoustic signal is propagating. Therefore, the acoustic medium 22 has optical anisotropy in a state where no acoustic signal is propagating, and expresses the function described above of the elliptically-polarized light generation section 6.

<Results of Experiment of Detection Optical System>

Figure 9:
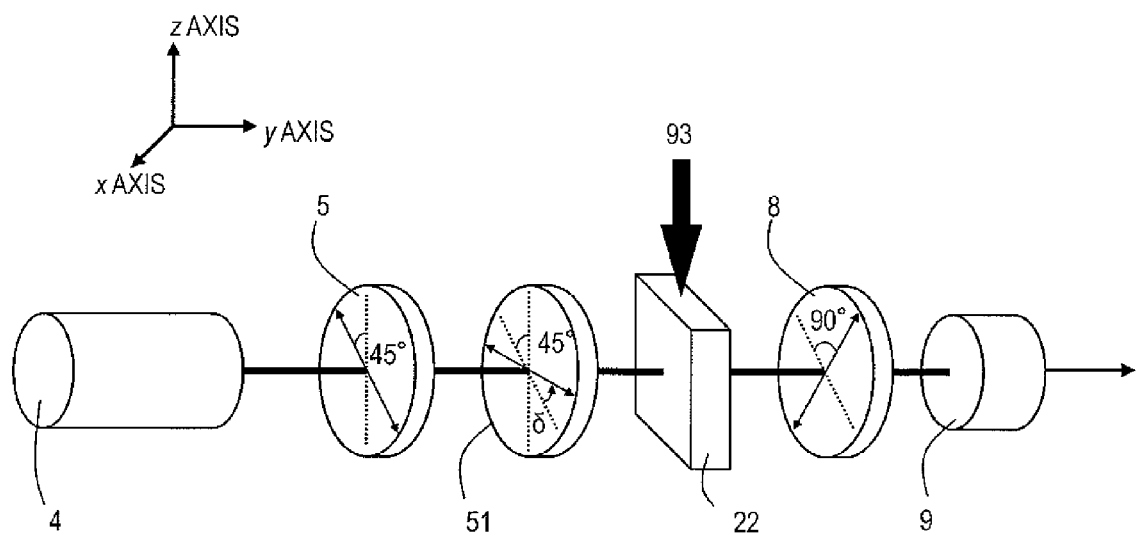
FIG. 9 is a schematic diagram showing a configuration of an optical microphone used in an experiment.

Next, results of an experiment of detecting an acoustic signal using the detection optical system 2 will be described. FIG. 9 schematically shows a configuration used for confirming the principle of the optical microphone 1. In the optical microphone 1 shown in FIG. 9, an He—Ne laser (Model Number: 05-LHR-111 from Sigma Koki) was used as the light source 4. A ¼ wave plate (Model Number: 43700-K from Edmund Optics) was used as the wave plate 51. A photodiode (Model Number: C10508 from Hamamatsu Photonics) was used as the photodetector 9. A polarizer (Model number: UPM-050-VIS) from Meadowlark optics was used as the first polarizer 5 and the second polarizer 8. A block of dry silica gel having a sound velocity of 50 m/s, a thickness of 5 mm, a size of 10 mm×10 mm was used as the acoustic medium 22. The application of a static pressure 93 to the acoustic medium 22 was done mechanically, and the applied pressure was measured by a digital force gauge.

Figure 10:
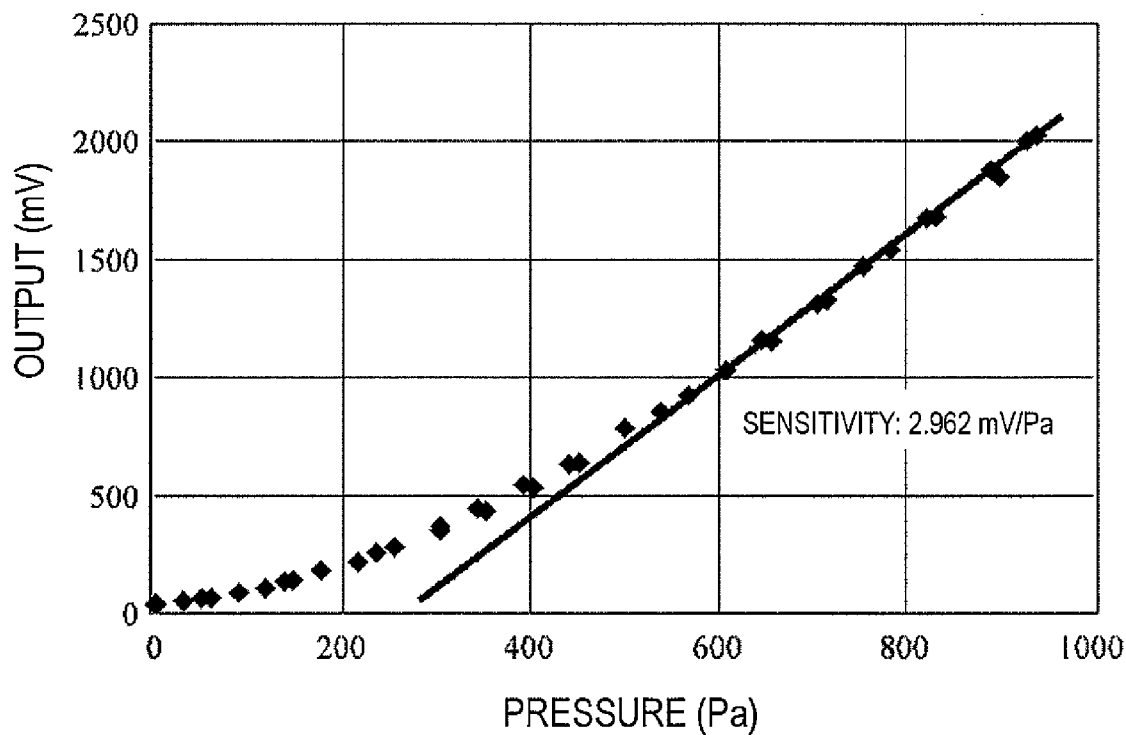
FIG. 10 is a graph showing the magnitude of an output electric signal from a photodiode with respect to the pressure applied to an acoustic medium 22 where an acoustic signal is detected using an optical microphone which does not have a wave plate.

FIG. 10 shows the magnitude of the output electric signal from the photodetector 9 where the wave plate 51 is not inserted. The magnitude of the electric signal corresponds to the pressure applied to the acoustic medium 22. The horizontal axis of FIG. 10 is the pressure P applied to the acoustic medium 22, and the vertical axis is the magnitude of the output electric signal S from the photodetector 9.

It can be seen from FIG. 10 that the level S of the electric signal is in proportion to the pressure P squared. In the vicinity of pressure P=0, the amount of change ΔS/ΔP of the magnitude of the electric signal with respect to the pressure change ΔP is small. That is, it can be seen that the sensitivity is low in the vicinity of P=1 Pa, which corresponds to the sound pressure of an acoustic signal.

In contrast, in the range of P=600 Pa or more, ΔS/ΔP shows a substantially constant value of 2.962 mV/Pa. FIG. 10 shows a straight line where ΔS/ΔP is 2.962 mV/Pa.

Figure 11:
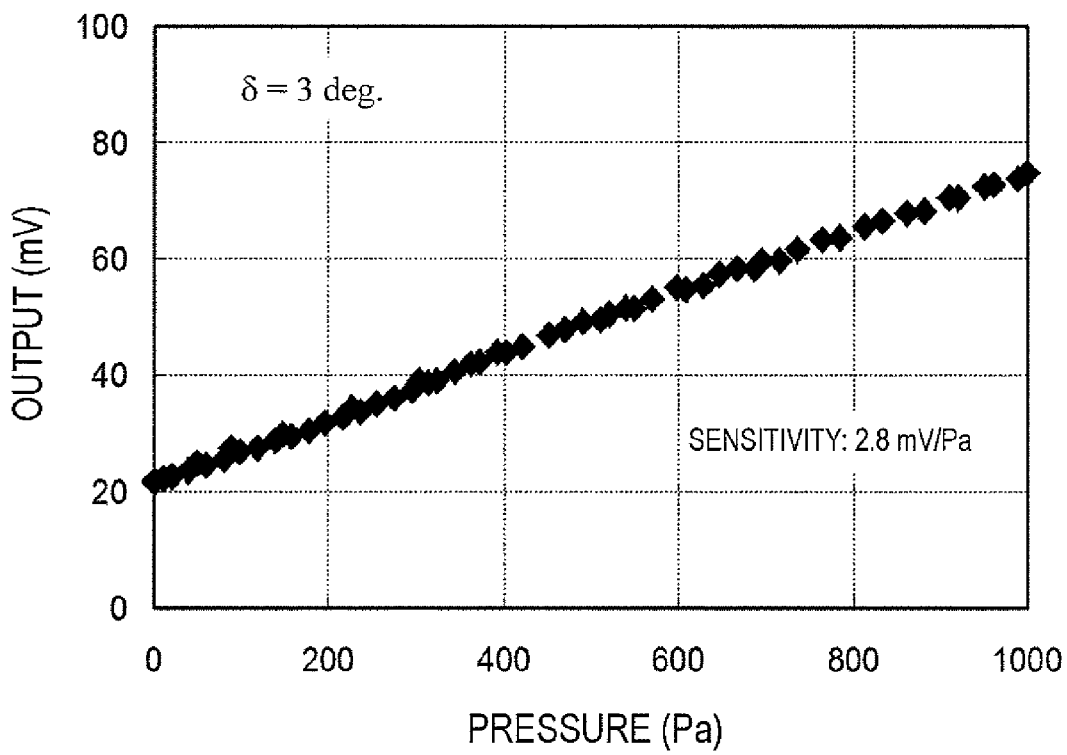
FIG. 11 is a graph showing the magnitude of an output electric signal from a photodiode with respect to the pressure applied to an acoustic medium where an acoustic signal is detected using an optical microphone which has a wave plate.

FIG. 11 shows the magnitude of the output electric signal from the photodetector 9 where the wave plate 51 is inserted. As in FIG. 10, the magnitude of the electric signal corresponds to the pressure applied to the acoustic medium 22. The horizontal axis of FIG. 11 is the pressure P applied to the acoustic medium 22, and the vertical axis is the magnitude of the output electric signal S from the photodetector 9. The optical axis of the wave plate 51 is rotated counterclockwise by a rotation angle δ=3° with respect to the optical axis of the first polarizer 5 as seen from the light source 4 side.

As can be seen from FIG. 11, ΔS/ΔP in the vicinity of pressure P=0 is not zero. The linearity between the pressure P and the magnitude of the output electric signal S is generally maintained across the entire pressure range (0 Pa or more and 1000 Pa or less).

Note that the detection sensitivity ΔS/ΔP is 0.056 mV/Pa in the graph shown in FIG. 11, whereas the detection sensitivity at P=600 Pa is 2.962 mV/Pa in the graph shown in FIG. 10, and the values are different from each other. This is because the gain of the amplifier provided in the photodetector 9 differs between the measurement of FIG. 10 and that of FIG. 11. If the measurement conditions for the measurement of FIG. 11 and those for the measurement of FIG. 10 are matched with each other by converting the gain, the detection sensitivity ΔS/ΔP shown in FIG. 11 will be 2.8 mV/Pa. This value coincides with the detection sensitivity at P=600 Pa in the graph shown in FIG. 10.

Figure 12:
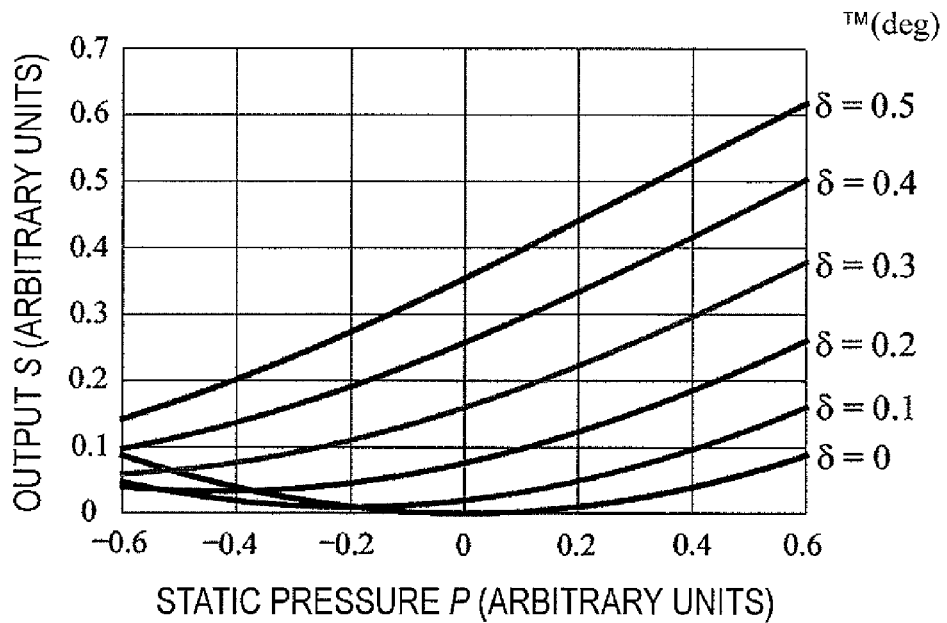
FIG. 12 is a graph obtained by overplotting, for different angles, calculation results of an electric signal output curve of a photodiode with respect to the amount of static pressure application, using the optical microphone shown in FIG. 9.

FIG. 12 is a graph showing the relationship between the pressure P and the photodetector output S obtained by calculation, where the rotation angle δ of the optical axis of the wave plate 51 shown in FIG. 9 is changed from 0° to 0.5° in steps of 0.1°. In FIG. 12, the horizontal axis and the vertical axis are not measured values but are shown in arbitrary units.

Where the rotation angle δ of the optical axis of the wave plate 51 is 0°, the optical axis of the wave plate 51 coincides with the optical axis of the first polarizer 5. Therefore, irrespective of the insertion of the wave plate 51, linearly-polarized light having passed through the first polarizer 5 is not converted to elliptically-polarized light, and shows a relationship between the pressure P and the photodetector output S similar to the measurement results shown in FIG. 10. Specifically, the magnitude S of the electric signal output is a linear function of the pressure P ($S \propto P^2$) passing through the origin.

In contrast, if δ is greater than 0, linearly-polarized light having passed through the first polarizer 5 is converted through the wave plate 51 to elliptically-polarized light. Since the two orthogonal polarization directions of the elliptically-polarized light are non-parallel and non-vertical to the optical axis of the second polarizer 8, there is produced a component parallel to the optical axis of the second polarizer 8, irrespective of how the polarization state is converted as the elliptically-polarized light passes through the acoustic medium 22 with the pressure P applied thereto. Therefore, it is possible to obtain the electric signal output S from the photodetector 9, irrespective of the pressure P.

As shown in FIG. 12, as δ increases, the origin of the linear function moves in the negative direction with respect to the pressure P and the positive direction of the output S ($S=(P+c1)^2+c2$, where c1 and c2 are constants that are not dependent on the pressure P). As a result, the output S increases in the vicinity of where the pressure P is zero. The detection sensitivity $\Delta S/\Delta P$ (gradient) in the vicinity of P=0 increases, and the linearity increases. This also improves the characteristics as a microphone. It can be seen from FIGS. 10, 11 and 12 that it is possible to adjust the magnitude of the output value S, the detection sensitivity $\Delta S/\Delta P$ and the linearity thereof in the vicinity of P=0 based on the rotation angle of the optical axis of the wave plate 51 δ. That is, by using the wave plate 51, it is possible to increase the detection sensitivity of the detection optical system 2, and it is possible to arbitrarily set the detection characteristics.

<Signal Processing Section 17>

By including the detection optical system 2 described above, the optical microphone 1 of the present embodiment can detect an acoustic signal with a high detection sensitivity using a simple configuration. For example, it is possible to obtain a detection sensitivity of about 3 mV/Pa. However, when used as an actual microphone, it may be required of an even higher detection sensitivity. Therefore, the optical microphone 1 of the present embodiment includes a signal processing section 17.

As shown in FIG. 1, the signal processing section 17 of the optical microphone 1 includes a first amplifier 13, a direct-current component removing section 15, a second amplifier 14, and an equalizer 16.

The first amplifier 13 amplifies an electric signal output from the photodetector 9. The electric signal immediately after it is output from the photodetector 9 is subjected to signal amplification through the first amplifier in order to reduce the noise figure for the signal processing section 17 as a whole. It is preferred to use a low-noise amplifier as the first amplifier 13.

The gain of the first amplifier 13 may be set so that when the acoustic signal 10 of a maximum sound pressure that can be received by the optical microphone 1 is input, the magnitude of the output electric signal of the photodetector 9 amplified through the first amplifier 13 is at least less than or equal to the saturated output voltage of the first amplifier 13. For example, in order to sufficiently ensure the linearity, the gain may be set to be less than or equal to the 1 dB gain compression point of the first amplifier 13.

In order for the optical microphone 1 to function as a microphone, the received signal 12 preferably satisfies linearity with respect to the acoustic signal 10. The condition of the gain of the first amplifier 13 is preferably determined so that the received signal 12 satisfies linearity with respect to the acoustic signal 10. By setting the highest gain that satisfies this condition, it is possible to best reduce the noise figure for the signal processing section 17 as a whole.

The direct-current component removing section 15 removes a signal component that does not fluctuate over time (hereinafter referred to simply as the "DC component") from the electric signal output from the first amplifier 13. As shown in FIG. 11, the electric signal output from the first amplifier 13 includes a direct-current component (DC component) of a certain magnitude even if there is no input of the acoustic signal 10 (the pressure is zero). By removing this direct-current component, it is possible to set a high gain at the second amplifier 14. As a result, it is possible to realize a high acoustic detection sensitivity to a degree that cannot be realized only with the detection optical system 2.

As with the first amplifier 13, the gain of the second amplifier 14 is determined based on the maximum value of the signal input to the second amplifier 14 and the value of the saturated output voltage of the second amplifier 14. Therefore, higher gains can be set when a signal component that is not dependent on the acoustic signal 10 is removed by the direct-current component removing section 15, and a smaller signal is input to the second amplifier 14. As the direct-current component removing section 15, a high-pass filter for removing an electric signal less than or equal to the lowest frequency of the received sound frequency range of the optical microphone 1 or a band-pass filter that passes an electric signal in the received sound frequency range of the optical microphone 1 can be used.

Figure 13:
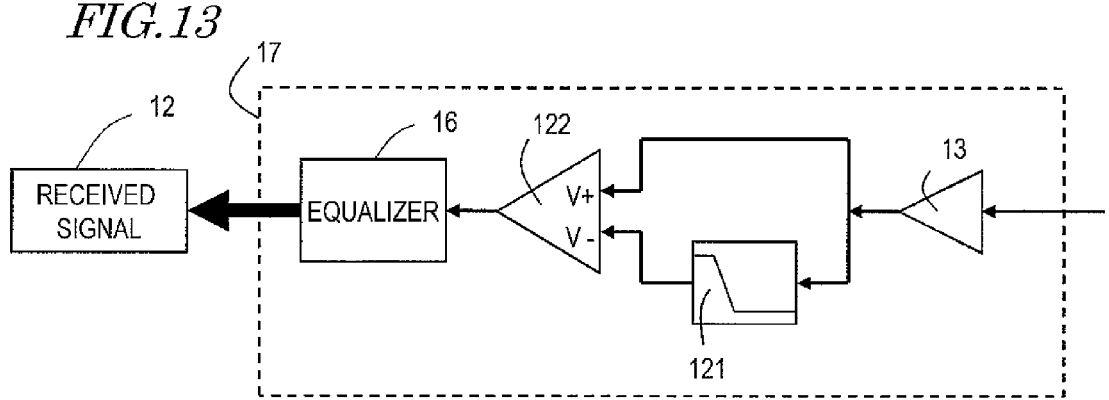
FIG. 13 is a diagram showing a configuration of a signal processing section in the optical microphone of FIG. 1.

FIG. 13 shows a configuration of the signal processing section 17 where a low-pass filter 121 is used as the direct-current component removing section 15 and a differential amplifier 122 is used as the second amplifier. An electric signal output from the first amplifier 13 is divided in two, one of which is allowed to pass through the low-pass filter 121, thereby extracting the DC component from the electric signal. The pass band of the low-pass filter 121 is set to be less than or equal to the lowest frequency the received sound frequency range of the optical microphone 1. The differential voltage between the other one of the divided electric signals and the extracted DC component is amplified through the differential amplifier 122. Thus, in the electric signal output from the differential amplifier 122, the DC component has been removed.

Figure 14:
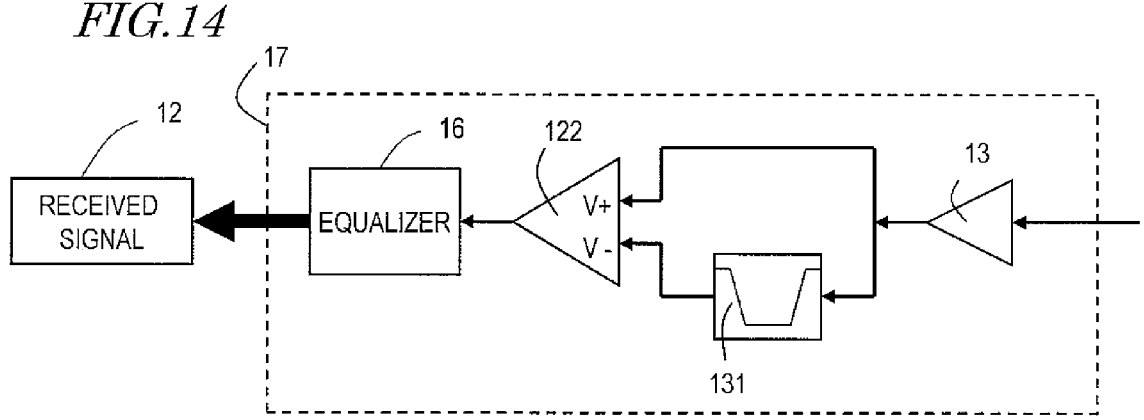
FIG. 14 is a diagram showing a configuration of a signal processing section in the optical microphone of FIG. 1.

FIG. 14 shows a configuration of the signal processing section 17 in which a band stop filter 131 is used as the direct-current component removing section 15, and the differential amplifier 122 is used as the second amplifier. An electric signal output from the first amplifier 13 is divided in two, one of which is allowed to pass through the band stop filter 131, thereby extracting the DC component from the electric signal. The stop band of the band stop filter 131 is set so as to include the received sound frequency range of the optical microphone 1. The differential voltage between the other one of the divided electric signals and the extracted DC component is amplified through the differential amplifier 122. Thus, in the electric signal output from the differential amplifier 122, the DC component has been removed. With this configuration, it is possible to also effectively remove a noise component having a high frequency, in addition to removing a DC component.

The equalizer 16 corrects signal distortions caused by other components in the detection optical system 2, the photodetector 9 and the signal processing section 17. The electric signal output from the detection optical system 2 is in proportion to the acoustic signal intensity squared. Other components have inherent distortions. The equalizer 16 equalizes (processes the timbre of) the received acoustic signal so that the optical microphone 1 has acoustic characteristics desired by the user. Thus, it is possible to obtain the received signal 12 having intended acoustic characteristics.

Figure 15:
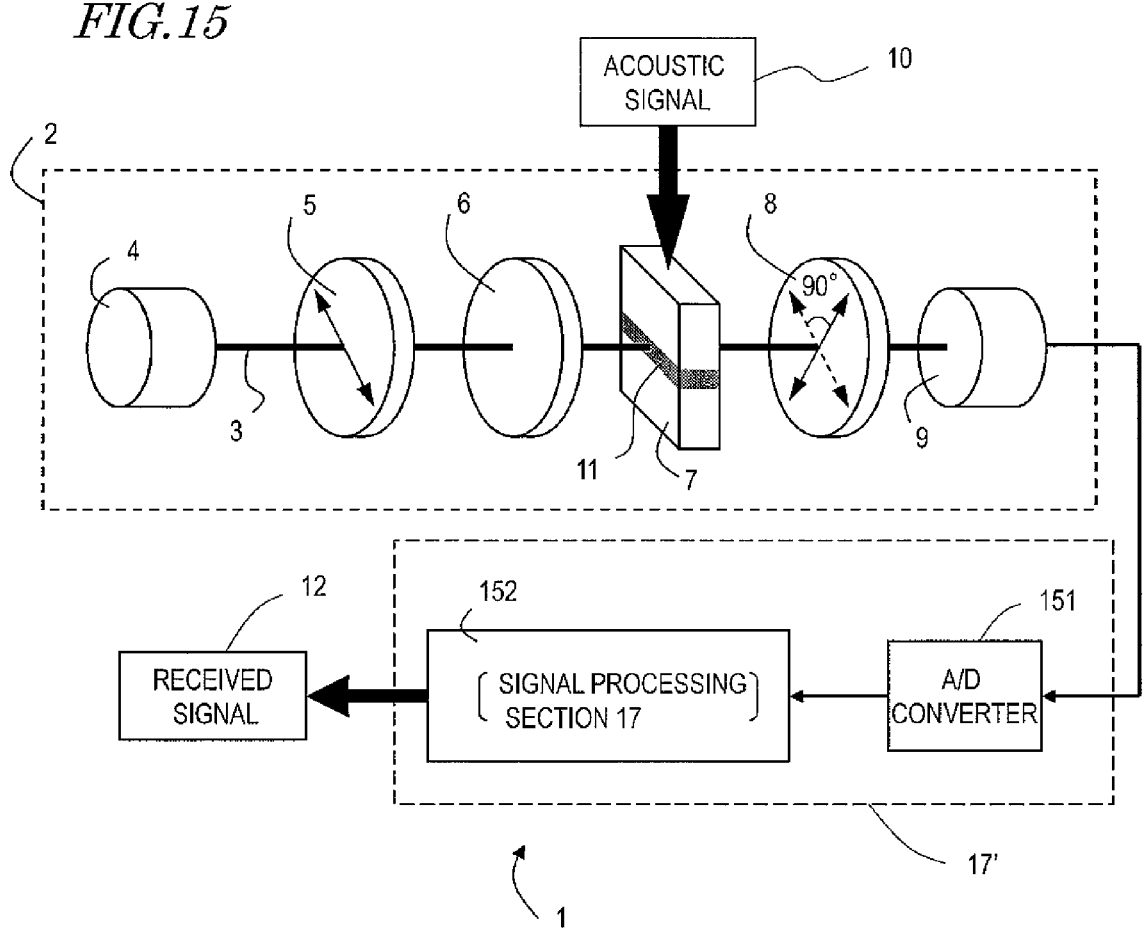
FIG. 15 is a diagram schematically showing another configuration of an optical microphone according to the first embodiment.

While the signal processing section 17 is formed by an analog circuit in the embodiment above, the signal processing section 17 may be formed by a digital circuit. FIG. 15 shows a configuration of the optical microphone 1 where a signal processing section 17' is formed by a digital circuit. In the optical microphone 1 shown in FIG. 15, the signal processing section 17 includes an A/D converter 151 and a digital circuit 152. The output from the photodetector 9 is converted to a digital signal by the A/D converter 151. The digital electric signal is input to the digital circuit 152. The digital circuit 152 performs a process equivalent to that of the analog signal processing section 17 described above using a digital electric signal. Thus, a received digital signal 12 is generated. The digital circuit 152 may be formed by a microcomputer, or the like, including an arithmetic circuit such as a CPU.

With the optical microphone 1 of the present embodiment, an acoustic signal is detected by the rotation of the polarization plane of light due to the birefringence of light, but not by the interference of light. Therefore, downsizing is possible, and it is possible to realize a high-sensitivity optical microphone that is less influenced by environmental change. By converting linearly-polarized light to be used for detection to elliptically-polarized light between the first polarizer and the second polarizer, it is possible to detect an acoustic signal with an even higher sensitivity and to increase the linearity of the detection sensitivity.

In the optical microphone 1 of the present embodiment, the sound-receiving section and the electric circuit are completely electrically separated from each other. Therefore, it can suitably be used as an acoustic sensor, or the like, that is robust against noise even under high-electric noise environments. Since the mechanical/optical resonance phenomenon is not utilized, it has a wide receiving range with respect to both the amplitude and the phase of the acoustic signal. Therefore, it can suitably be used in a sound receiver, a sound-recording microphone, a measurement reference microphone, and the like, for use with an acoustic signal modulated over a wide range.

Note that in the present embodiment, in the description using FIGS. 1, 5 and 6, the optical axis of the first polarizer 5 forms an angle of 45° with respect to the orientation of the stress vector generated in the acoustic medium 22 by the application of the acoustic signal 10 and the static pressure 93. However, it is possible to detect an acoustic signal as long as the orientation of the stress vector generated in the acoustic medium 22 is not parallel to the optical axis of the first polarizer 5, and the angle of the optical axis of the first polarizer 5 is not limited to that of the embodiment above. In the embodiment above, the components of the detection optical system 2 are arranged with spacings therebetween. However, as is clear from the above description, spacings between components are not necessary for the operation principle of the optical microphone 1, and all or some of the components may be arranged in contact with one another. Such an arrangement is effective in further downsizing the optical microphone 1.

Japanese Laid-Open Patent Publication No. 2009-128103 (hereinafter, referred to as "Patent Document No. 3") discloses an abnormal vibration detection apparatus for detecting an abnormal signal of an electric motor or a pipe, wherein an optical fiber provided between a pair of polarizers is arranged in an electric motor or a pipe so as to detect polarization fluctuations occurring in light passing through the optical fiber due to the vibration of the electric motor. With this apparatus, it is possible to detect an abnormal vibration greater than or equal to some hundreds of kHz that is different from the natural vibration during normal operation over a wide area where the optical fiber is arranged. However, since a vibration from the entirety of such a wide area lacks phase information of the vibration, it is not possible to have this apparatus function as a microphone for detecting an acoustic wave. In contrast, since the microphone of the present embodiment detects a refractive index change of the acoustic medium 22 due to a sound pressure at the point through which the light beam in the acoustic medium 22 passes, it can detect the phase information and can suitably function as a microphone for detecting an acoustic signal. In this regard, the optical microphone of the present embodiment is totally different from the abnormal vibration detection apparatus disclosed in Patent Document No. 3.

Second Embodiment

Figure 16:
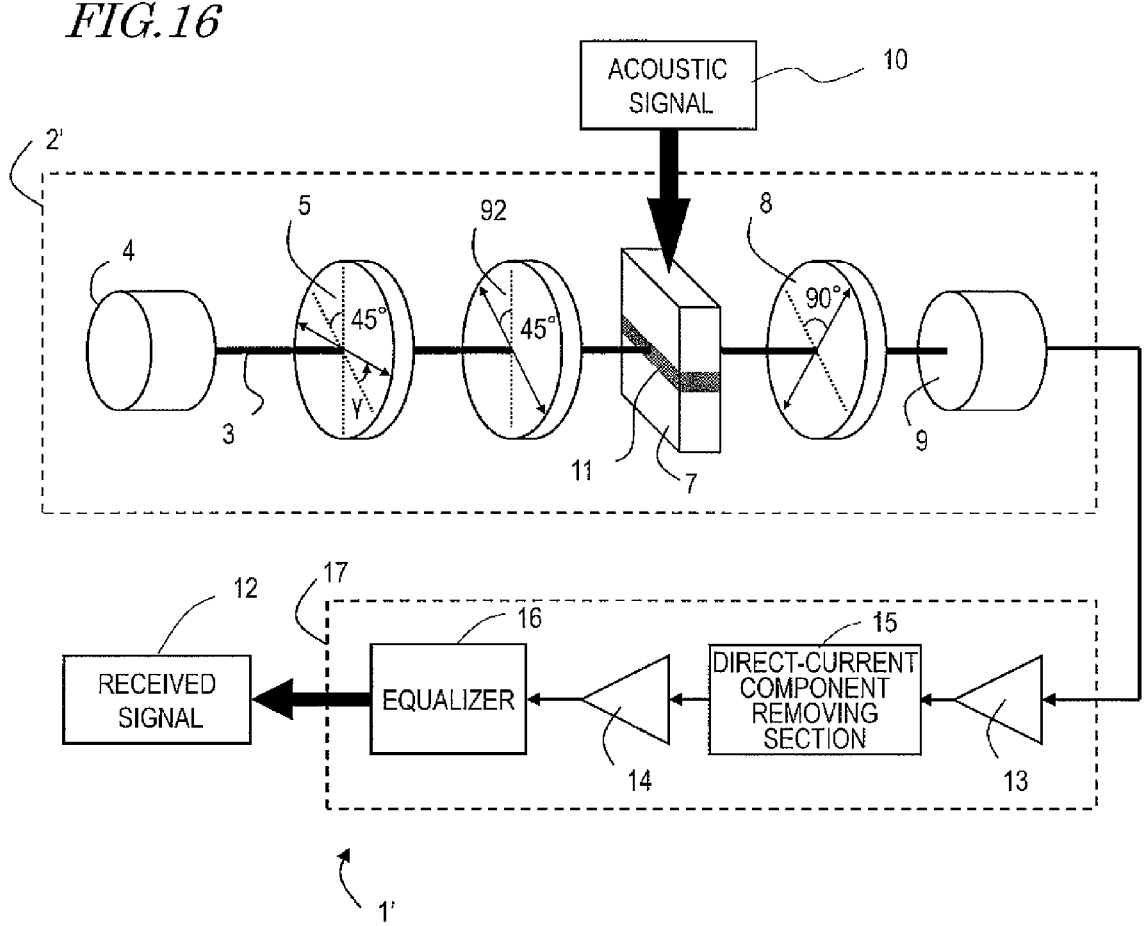
FIG. 16 is a diagram schematically showing a configuration of an optical microphone according to a second embodiment.

FIG. 16 shows a configuration of a second embodiment of an optical microphone of the present invention. An optical microphone 1' includes a detection optical system 2' and the signal processing system 17. As in the first embodiment, the detection optical system 2' is used to detect an acoustic signal propagating through the environment around the optical microphone 1' to generate an electric signal, and the signal processing system performs a signal process on the electric signal, thereby generating the received signal 12. In FIG. 16, like components to those of the first embodiment are denoted by like reference numerals. In the present embodiment, a ¼ wave plate 92 is used as the elliptically-polarized light generation section 6.

In the optical microphone 1', the relative angle between the optical axes of the first polarizer 5, the second polarizer 8 and the ¼ wave plate 92 used as the elliptically-polarized light generation section 6 is different from the first polarizer 5, the second polarizer 8 and the elliptically-polarized light generation section 6 of the optical microphone 1 of the first embodiment. In the first embodiment, the optical axis of the first polarizer 5 and the optical axis of the second polarizer 8 are orthogonal to each other, and linearly-polarized light having passed through the first polarizer 5 is converted to elliptically-polarized light by rotating the optical axis of the wave plate from the optical axis of the first polarizer 5. In contrast, in the present embodiment, the optical axis of the elliptically-polarized light generation section 6, i.e., the optical axis of the ¼ wave plate 92, is arranged orthogonal or parallel to the optical axis of the second polarizer 8. The degree of elliptical polarization of elliptically-polarized light having passed through the ¼ wave plate 92 is adjusted by rotating the optical axis of the first polarizer 5 from the direction orthogonal to the optical axis of the second polarizer 8. Herein, the optical axis of the elliptically-polarized light generation section 6 and the optical axis of the second polarizer 8 being orthogonal to each other refers to a case where they form an angle φ that satisfies the relationship of Expression 1 as described above in the first embodiment.

Figure 17:
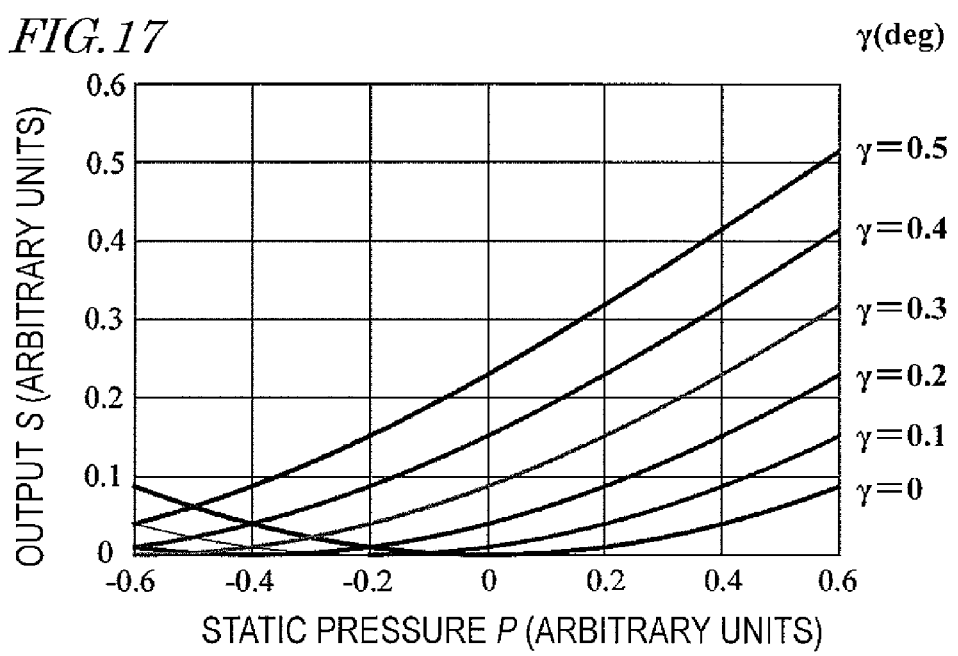
FIG. 17 is a graph obtained by overplotting, for different angles, calculation results of an electric signal output curve of a photodiode with respect to the amount of static pressure application, using the optical microphone shown in FIG. 16.

With the optical microphone 1' shown in FIG. 16, the relationship between the pressure P and the output S was examined, while the angle γ was changed over a range of 0 to 0.5° in steps of 0.1°, by calculating the magnitude of the electric signal detected at the photodetector 9 when a static pressure is applied to the acoustic medium 22 of the sound-receiving section 7 as in the first embodiment, where γ is the angle between the optical axis of the first polarizer 5 and the direction orthogonal to the optical axis of the second polarizer 8. The results are shown in FIG. 17. In FIG. 17, the horizontal axis and the vertical axis are shown in arbitrary units.

As shown in FIGS. 16 and 17, where the angle γ between the optical axis of the first polarizer 5 and the direction orthogonal to the optical axis of the second polarizer 8 is 0°, the optical axis of the first polarizer 5 and the optical axis of the ¼ wave plate 92 are orthogonal to the optical axis of the second polarizer 8. Therefore, linearly-polarized light having passed through the first polarizer 5 has a polarization plane that coincides with the optical axis of the ¼ wave plate 92, and passes through the ¼ wave plate 92 as linearly-polarized light. Since the polarization plane of linearly-polarized light having passed through the ¼ wave plate 92 and the optical axis of the second polarizer 8 are orthogonal to each other, the magnitude of the electric signal detected at the detector 9 is zero if optical anisotropy is not expressed in the sound-receiving section 7 by the propagation of the acoustic signal 10 therethrough, i.e., if a static pressure is not applied to the sound-receiving section 7.

Where the angle γ is set to be greater than 0°, the polarization plane of linearly-polarized light having passed through the first polarizer 5 is non-parallel to the optical axis of the ¼ wave plate 92, and therefore it is converted to elliptically-polarized light. Therefore, even in a state where no static pressure is applied to the sound-receiving section 7, the magnitude of the electric signal detected at the detector 9 is greater than zero since elliptically-polarized light includes a polarized component that is parallel to the optical axis of the second polarizer 8. However, the optical axis of the ¼ wave plate 92 is arranged to be orthogonal to the optical axis of the second polarizer 8. Therefore, the elliptically-polarized light has two polarization directions parallel and vertical to the optical axis of the second polarizer 8. As a result, due to changes in polarization state received from the sound-receiving section 7, the polarized component of the elliptically-polarized light that is parallel to the optical axis of the second polarizer 8 can possibly become zero. From these, according to the present embodiment, the level S of the electric signal detected at the detector 9 is in proportion to $(P+c1')^2$ ($c1'$ is a positive constant that is not dependent on the pressure P).

As shown in FIG. 17, as the angle γ increases, the polarized component included in the elliptically-polarized light that is parallel to the optical axis of the second polarizer 8 increases, and as represented by $(P+c1')^2$, the apex of the linear function moves in the positive direction of the output S. As a result, a large output S is obtained also in the vicinity of where the pressure P is zero.

As can be seen from a comparison between the graph of FIG. 12 and the graph of FIG. 17, while the relationship between the output S and the pressure P due to elliptical polarization is represented by $(P+c1)^2+c2$ ($c1$ and $c2$ are constants that are not dependent on the P) in the first embodiment, it is represented by $(P+c1')^2$ in the second embodiment. Thus, even if ΔS/ΔP at P=0 is the same between these embodiments, the output S at P=0 is smaller in the second embodiment. Since the gain of the amplifier 13 is determined by the saturated output voltage of the amplifier 13, a higher gain setting is possible in the present embodiment, where the output S at P=0 is smaller. Thus, the present embodiment can realize an optical microphone having a higher sensitivity.

Figure 18:
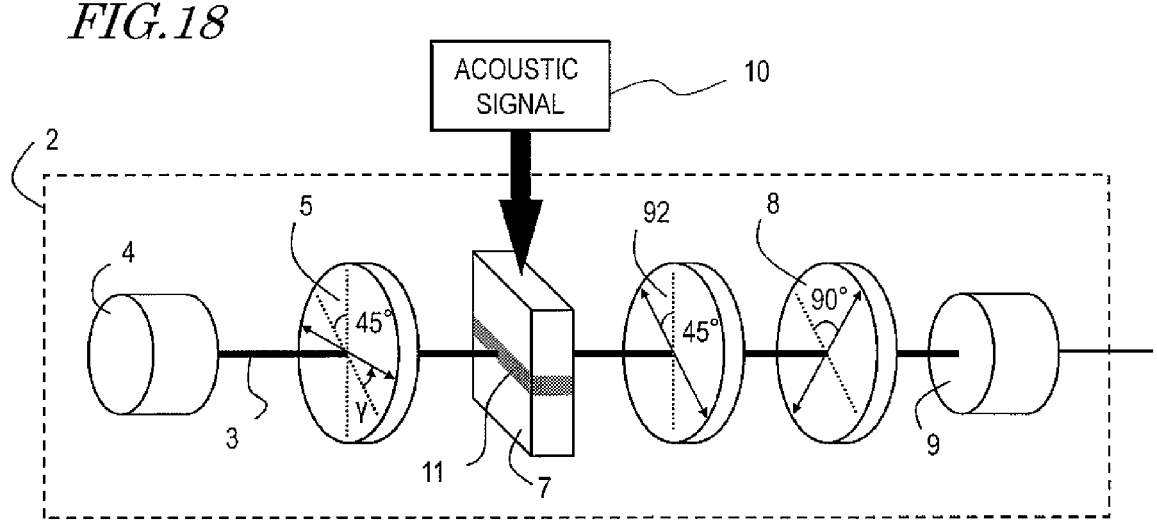
FIG. 18 is a diagram schematically showing another configuration of an optical microphone according to the second embodiment.

In the detection optical system 2' of the present embodiment, the ¼ wave plate 92 is provided between the first polarizer 5 and the sound-receiving section 7. However, similar effects can be obtained also when the ¼ wave plate 92 is provided between the sound-receiving section 7 and the second optical element 8 as shown in FIG. 18.

Although a ¼ wave plate is used in the present embodiment, an ⅛ wave plate, a ½ wave plate, other optical elements having optical anisotropy (however, such that the phase difference between polarized component light beams of transmitted light orthogonal to each other is not an integer multiple of the transmitted light wavelength), a liquid crystal, an optical crystal having optical anisotropy, etc., may be used.

In the present embodiment, the optical axis of the second polarizer 8 has an angle of 45° with respect to the orientation of the stress vector generated in the acoustic medium 22 by the application of the acoustic signal 10 and the static pressure 93. However, as long as the orientation of the stress vector generated in the acoustic medium 22 and the optical axis of the second polarizer 8 are not parallel to each other, it is possible to detect an acoustic signal, and the angle of the optical axis of the second polarizer 8 is not limited to that of the present embodiment. In the present embodiment, components of the detection optical system 2' are arranged with spacings therebetween. However, as is clear from the above description, spacings between components are not necessary for the operation principle of the optical microphone 1, and all or some of the components may be arranged in contact with one another. Such an arrangement is effective in further downsizing the optical microphone 1'.

Third Embodiment

FIGS. 19A to 19D show a third embodiment of an optical microphone according to the present invention. Although the signal processing section is not shown in these embodiment, the signal processing section described above in the first and second embodiments is included. In the first and second embodiments, either one of the detection optical systems 2 and 2' has its components arranged in a line along the light beam 3. However, the components of the detection optical systems 2 and 2' do not have to be arranged in a line. In the present embodiment, the optical path of the detection optical system is formed by using reflected light.

Figure 19A:
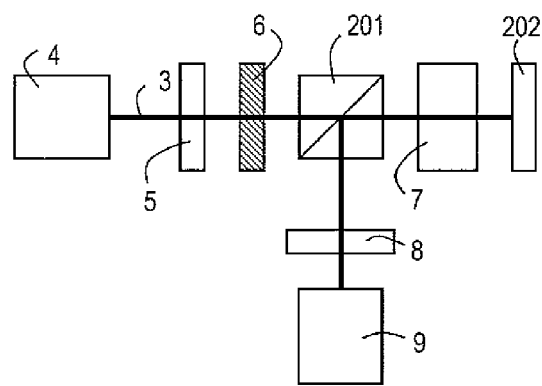
FIG. 19A to 19D are diagrams each schematically showing a configuration of an optical microphone according to a third embodiment.

The optical microphone shown in FIG. 19A includes the light source 4, the first polarizer 5, the elliptically-polarized light generation section 6, the second polarizer 8, the photodetector 9, the sound-receiving section 7, a beam splitter 201, and a mirror 202.

The light beam 3 output from the light source passes through the first polarizer 5 and the elliptically-polarized light generation section 6, and enters the beam splitter 201. The light beam 3, having passed through the beam splitter 201 as it is, undergoes a rotation of polarization plane by an acoustic signal through the sound-receiving section 7, and is reflected by the mirror 202 to enter the sound-receiving section 7 again. Now, after undergoing a rotation of polarization plane by an acoustic signal again, the light beam 3 enters the beam splitter 201, where the traveling direction is changed by a half mirror, to pass through the second polarizer 8 and enter the photodetector 9.

According to the present embodiment, the light beam passes through the sound-receiving section 7 twice. Therefore, it is possible to realize a detection sensitivity that is equivalent to an optical microphone in which it is allowed to pass through the acoustic medium 22 having a thickness twice as large. By folding back the optical path length of the light beam 3 with the mirror 202, it is possible to downsize the detection optical system 2. Therefore, according to the present embodiment, it is possible to realize an optical microphone that is small and has a high detection sensitivity. With a configuration shown in FIG. 19A, the sound-receiving section 7 can be arranged at an end portion of the optical microphone. Therefore, it is possible to improve the acoustic characteristics of the optical microphone.

Figure 19B:
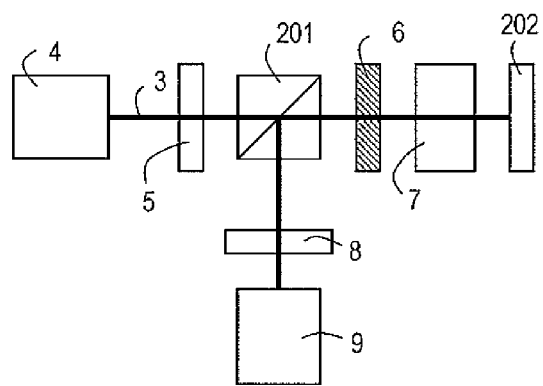
Figure 19C:
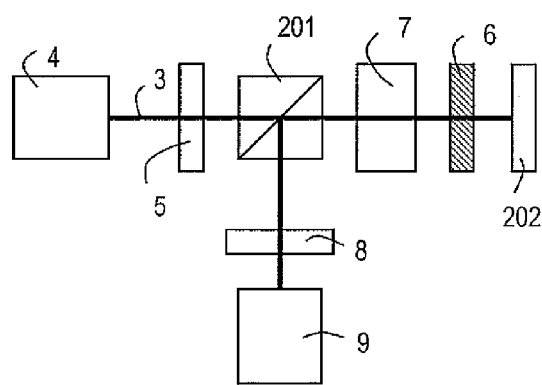
Figure 19D:
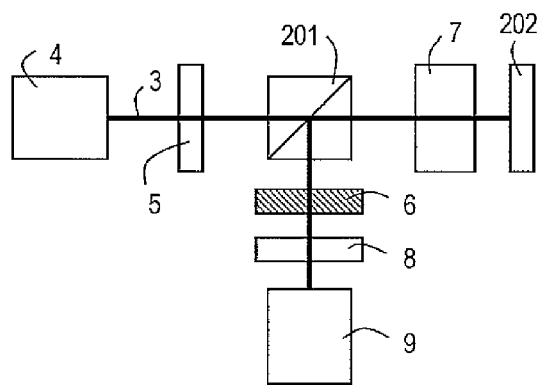
Figure 20:
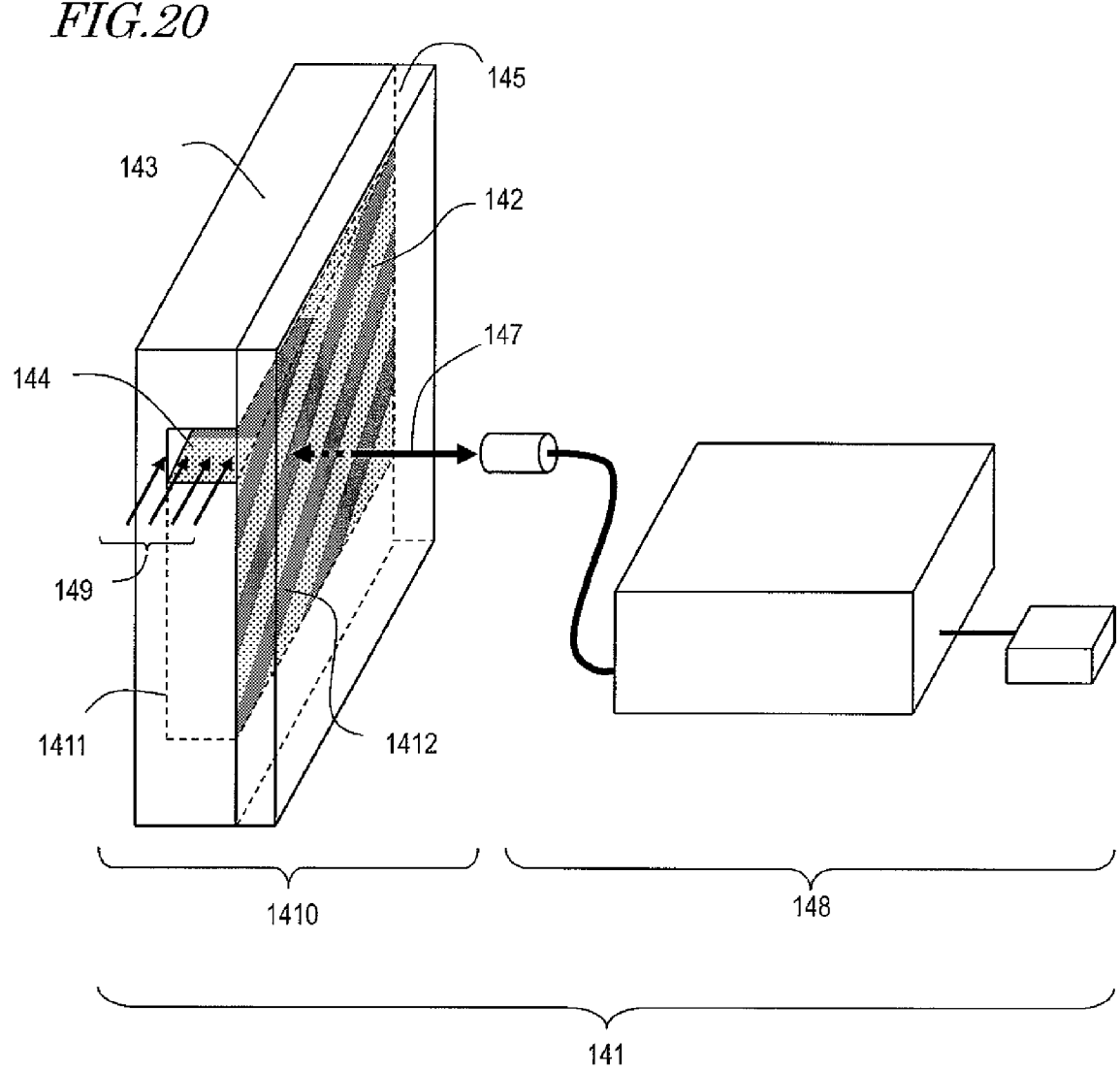
FIG. 20 is a diagram schematically showing a configuration of a conventional optical microphone.

The embodiment shown in FIG. 19B is different from the embodiment shown in FIG. 19A in that the elliptically-polarized light generation section 6 is arranged between the beam splitter 201 and the sound-receiving section 7. The embodiment shown in FIG. 19C is different from the embodiment shown in FIG. 19A in that the elliptically-polarized light generation section 6 is arranged between the sound-receiving section 7 and the mirror 202. The embodiment shown in FIG. 19D is different from the embodiment shown in FIG. 19A in that the elliptically-polarized light generation section 6 is arranged between the beam splitter 201 and the second polarizer 8. With any of these embodiments, it is possible to obtain effects similar to those of the embodiment shown in FIG. 19A.

In the embodiments shown in FIGS. 19A to 19D, components of the detection optical system 2 are arranged with spacings therebetween. However, all or some of the components may be arranged in contact with one another. Such an arrangement is effective in further downsizing the optical microphone.

Note that in the first to third embodiments described above, the signal processing section 17 outputs an electric signal having a frequency characteristic and a signal intensity that are associated with the acoustic signal. However, the signal processing section 17 may obtain a pressure of the acoustic signal 10 associated with the intensity of the light beam 3, and output an electric signal representing the obtained pressure. As described above, the intensity of the light beam 3 having passed through the second polarizer 8 is associated with the pressure of the acoustic signal. Therefore, for example, the relationship between the amount of increase in the intensity of the light beam 3 with respect to the intensity of the light beam 3 where no acoustic signal is propagating through the acoustic medium 22 and the pressure of the acoustic signal is obtained in advance by measurement, and the obtained relationship is stored in the signal processing section 17. Thus, using the stored relationship, the signal processing section 17 can convert the electric signal received from the photodetector 9 to an electric signal representing the pressure of the acoustic signal 10, and output the electric signal. Instead of using actual measurements, the signal processing section 17 may store calculated values or predetermined rules such as predetermined relational expressions.

Since the optical microphone disclosed in the present application is small, and the sound-receiving section and the electric circuit are completely electrically separated from each other, it is useful as an acoustic sensor, or the like, for use under high-electric noise environments. Since the optical microphone disclosed in the present application does not utilize the mechanical/optical resonance phenomenon, it has a wide receiving range with respect to both the amplitude and the phase of the acoustic signal, and therefore it can be used in applications such as a sound receiver, a sound-recording microphone and a measurement reference microphone, for use with an acoustic signal modulated over a wide range.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical microphone comprising:
   a light source;
   a first polarizer for allowing linearly-polarized light, of light output from the light source, to pass therethrough;
   a second polarizer for allowing linearly-polarized light having a different polarization plane from the first polarizer to pass therethrough;
   a sound-receiving section including an opening, and an acoustic medium having a smaller sound velocity than an air, wherein an acoustic signal entering through the opening propagates through the acoustic medium, the sound-receiving section being arranged so that the linearly-polarized light having passed through the first polarizer passes through the acoustic medium so as to cross a path along which the acoustic signal propagates and enters the second polarizer; and
   a photodetector for converting an intensity of light having passed through the second polarizer to an electric signal,
   wherein between the first polarizer and the second polarizer, the linearly-polarized light having passed through the first polarizer is given different phase shifts in two orthogonal directions which are each different from a polarization direction.

2. The optical microphone of claim 1, further comprising:
   an elliptically-polarized light generation section arranged between the first polarizer and the second polarizer for converting the linearly-polarized light to elliptically-polarized light,
   wherein the linearly-polarized light is given different phase shifts in the two orthogonal directions by the elliptically-polarized light generation section.

3. The optical microphone of claim 2, wherein the elliptically-polarized light generation section includes at least one of a wave plate, a liquid crystal and an optical crystal having an optical anisotropy.

4. The optical microphone of claim 2, wherein the elliptically-polarized light generation section is located between the first polarizer and the sound-receiving section.

5. The optical microphone of claim 2, wherein the elliptically-polarized light generation section is located between the second polarizer and the sound-receiving section.

6. The optical microphone of claim 2, wherein an optical axis of the elliptically-polarized light generation section and an optical axis of the second polarizer are orthogonal to each other.

7. The optical microphone of claim 1, wherein the acoustic medium has an optical anisotropy, and the linearly-polarized light is given different phase shifts in the two orthogonal directions by the optical anisotropy.

8. The optical microphone of claim 7, wherein the optical anisotropy is generated by a residual stress of the acoustic medium.

9. The optical microphone of claim 7, wherein the sound-receiving section further includes a pressure-giving section for giving a static pressure to the acoustic medium, and the optical anisotropy is generated by the static pressure.

10. The optical microphone of claim 1, wherein an optical axis of the first polarizer and an optical axis of the second polarizer are orthogonal to each other.

11. The optical microphone of claim 1, further comprising a signal processing section for amplifying an electric signal converted by the photodetector.

12. The optical microphone of claim 11, wherein the signal processing section includes a direct-current component removing section for removing a direct-current component from the electric signal output from the photodetector.

13. The optical microphone of claim 12, wherein:
the signal processing section further includes a differential amplifier; and
the differential amplifier amplifies and outputs a difference between the electric signal output from the photodetector and an output of the direct-current component removing section.

14. The optical microphone of claim 1, wherein the acoustic medium is a dry silica gel.

* * * * *